United States Patent
Pham et al.

(10) Patent No.: US 10,754,782 B1
(45) Date of Patent: Aug. 25, 2020

(54) APPARATUSES, METHODS, AND SYSTEMS TO ACCELERATE STORE PROCESSING

(71) Applicant: Intel Corporation, Santa Clara, CA (US)

(72) Inventors: Binh Pham, Burlingame, CA (US); Chen Dan, Hadera (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/370,893

(22) Filed: Mar. 30, 2019

(51) Int. Cl.
| G06F 12/00 | (2006.01) |
| G06F 12/0875 | (2016.01) |
| G06F 12/0831 | (2016.01) |
| G06F 9/54 | (2006.01) |
| G06F 9/30 | (2018.01) |
| G06F 16/901 | (2019.01) |
| G06F 12/12 | (2016.01) |

(52) U.S. Cl.
CPC ...... *G06F 12/0875* (2013.01); *G06F 9/30145* (2013.01); *G06F 9/544* (2013.01); *G06F 12/0831* (2013.01); *G06F 12/12* (2013.01); *G06F 16/9024* (2019.01)

(58) Field of Classification Search
None
See application file for complete search history.

(56) References Cited

U.S. PATENT DOCUMENTS

| 2005/0240752 A1* | 10/2005 | Yokoi ................... G06F 9/3851 712/1 |
| 2019/0303295 A1* | 10/2019 | Steinmacher-Burow ..................... G06F 9/522 |
| 2020/0034312 A1* | 1/2020 | Williams ............ G06F 12/1458 |

* cited by examiner

Primary Examiner — John A Lane
(74) Attorney, Agent, or Firm — Nicholson De Vos Webster & Elliott LLP

(57) ABSTRACT

Systems, methods, and apparatuses relating to circuitry to accelerate store processing are described. In one embodiment, a processor includes a (e.g., L1) cache, a fill buffer, a store buffer, and a cache controller to allocate a first entry of a plurality of entries in the fill buffer to store a first storage request when the first storage request misses in the cache, send a first request for ownership to another cache corresponding to the first storage request, detect a hit in the cache for a second storage request, update a globally observable buffer to indicate the first entry in the fill buffer for the first storage request is earlier in program order than the second storage request in the store buffer, allocate, before the second storage request is removed from the store buffer, a second entry of the plurality of entries in the fill buffer to store the third storage request when the third storage request misses in the cache, send a second request for ownership to another cache corresponding to the third storage request, and update the globally observable buffer to indicate the second entry in the fill buffer for the third storage request is later in program order than the second storage request in the store buffer.

24 Claims, 16 Drawing Sheets

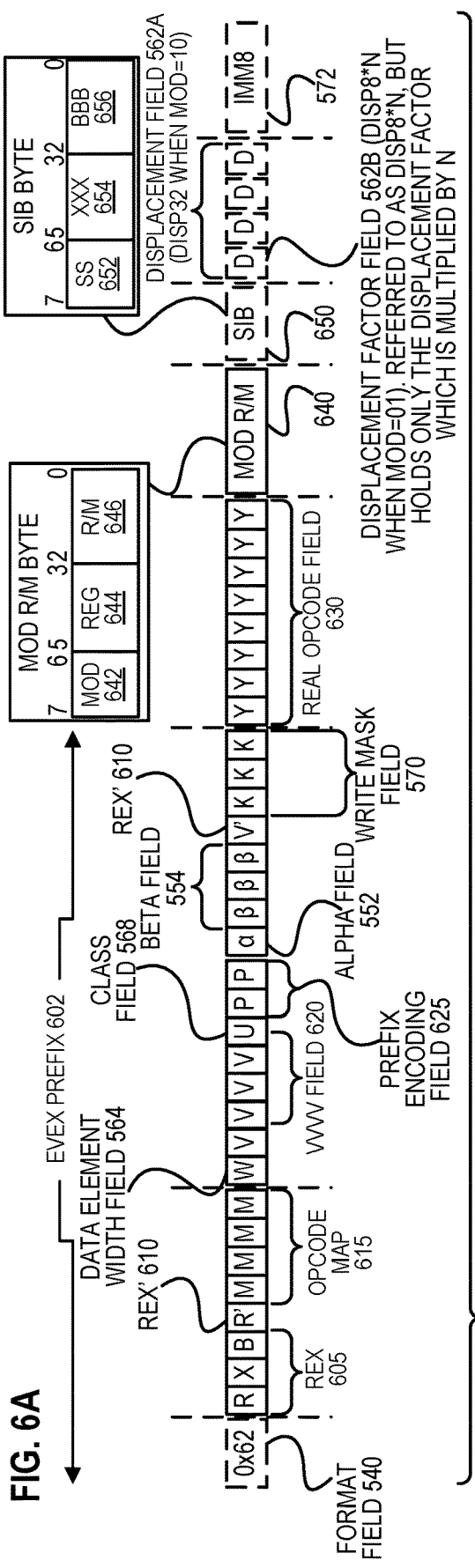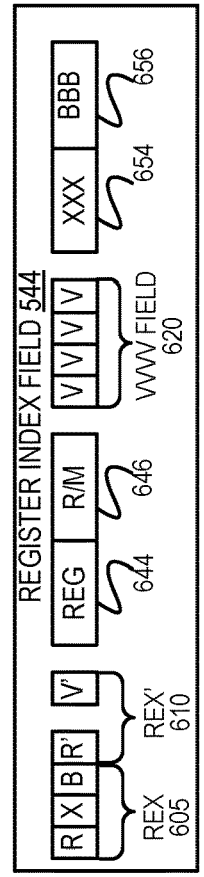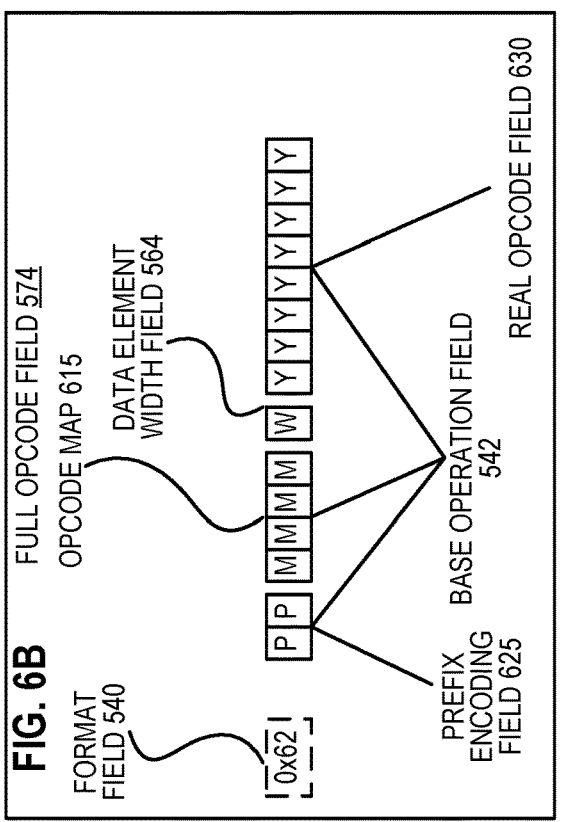

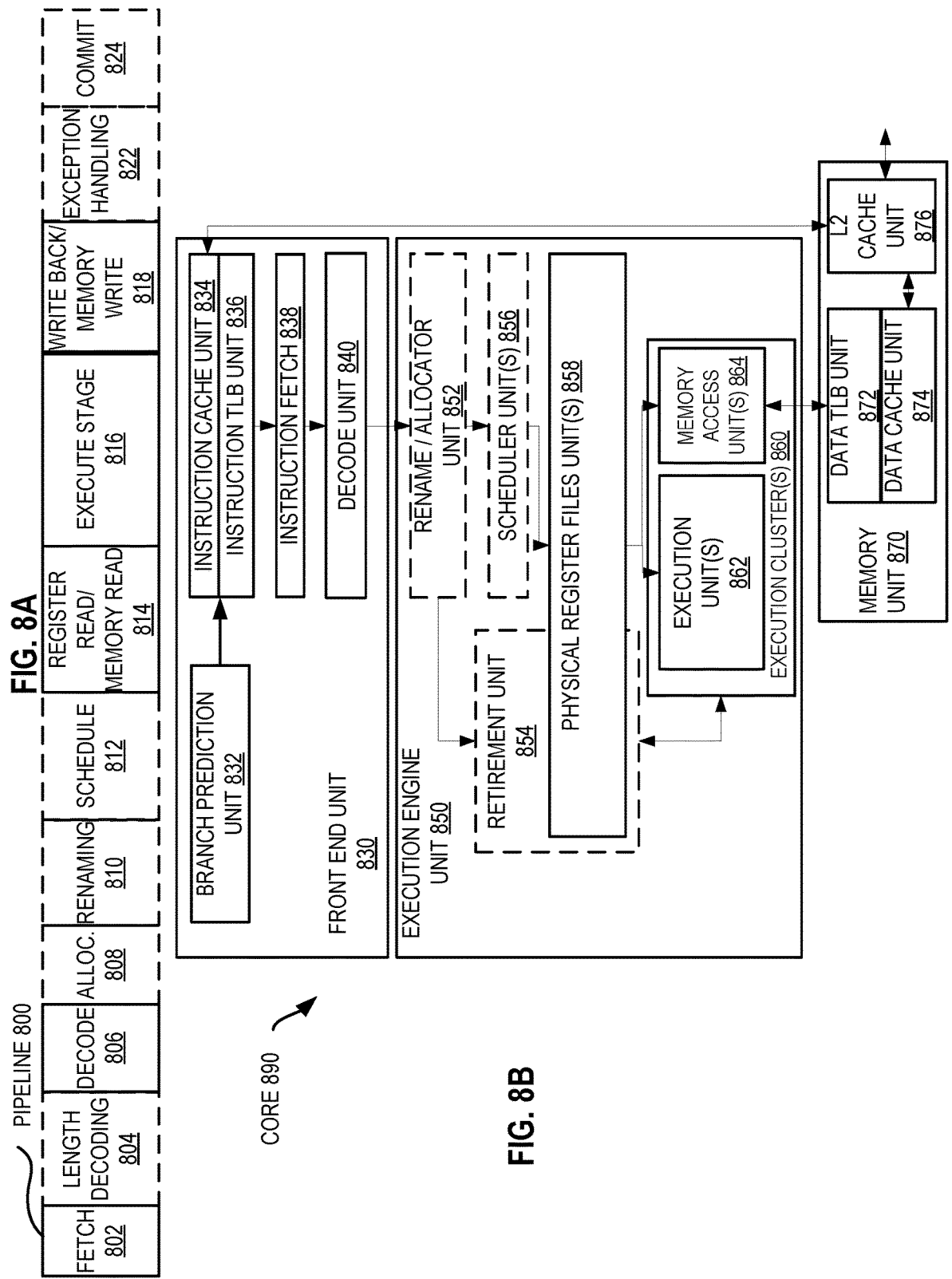

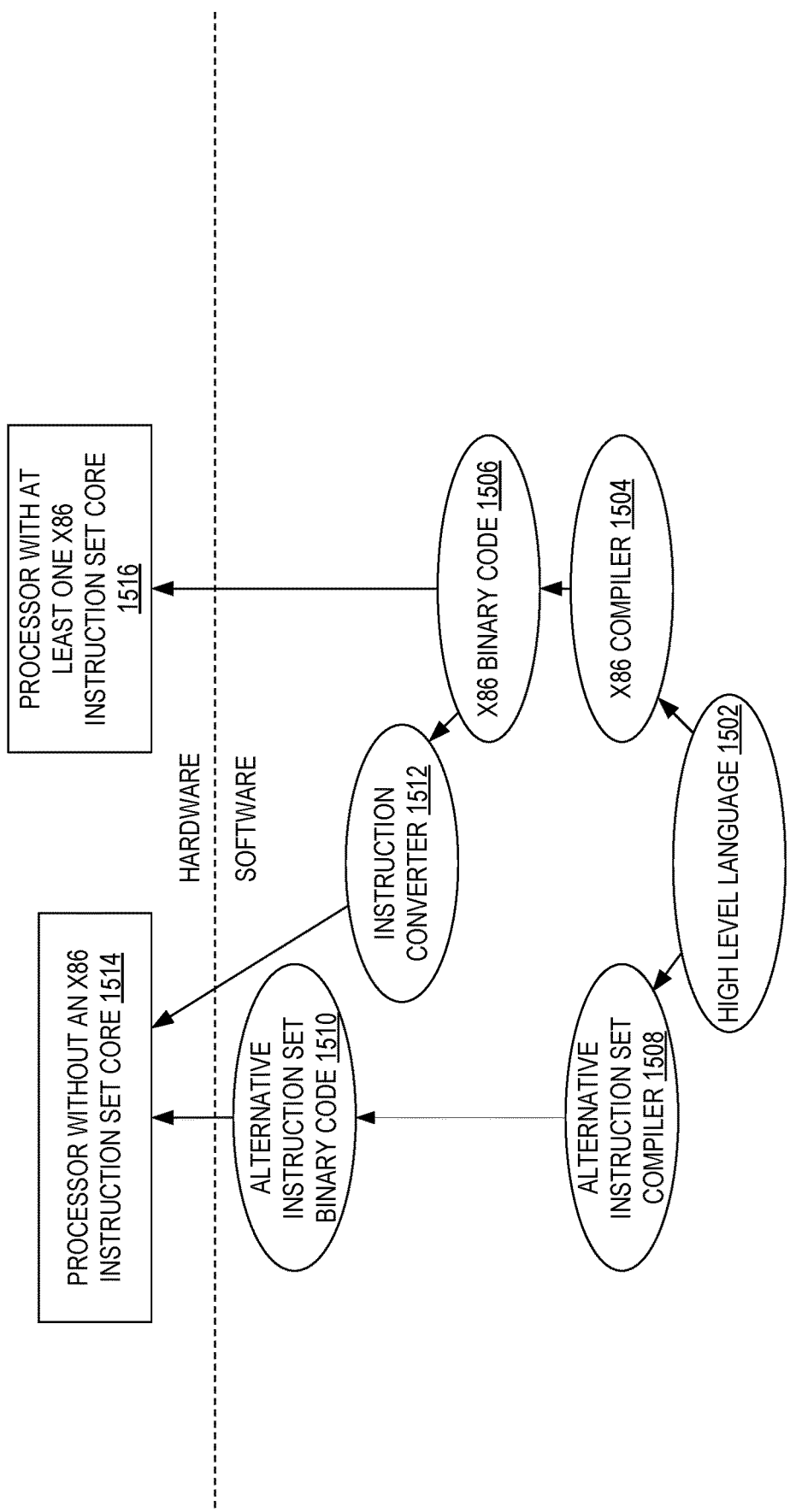

APPARATUSES, METHODS, AND SYSTEMS TO ACCELERATE STORE PROCESSING

TECHNICAL FIELD

The disclosure relates generally to electronics, and, more specifically, an embodiment of the disclosure relates to circuitry to accelerate store processing.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode circuit decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 6A is a block diagram illustrating fields for the generic vector friendly instruction formats in FIGS. 5A and 5B according to embodiments of the disclosure.

FIG. 6B is a block diagram illustrating the fields of the specific vector friendly instruction format in FIG. 6A that make up a full opcode field according to one embodiment of the disclosure.

FIG. 6C is a block diagram illustrating the fields of the specific vector friendly instruction format in FIG. 6A that make up a register index field according to one embodiment of the disclosure.

FIG. 8A is a block diagram illustrating both an exemplary in-order pipeline and an exemplary register renaming, out-of-order issue/execution pipeline according to embodiments of the disclosure.

FIG. 8B is a block diagram illustrating both an exemplary embodiment of an in-order architecture core and an exemplary register renaming, out-of-order issue/execution architecture core to be included in a processor according to embodiments of the disclosure.

FIG. 15 is a block diagram contrasting the use of a software instruction converter to convert binary instructions in a source instruction set to binary instructions in a target instruction set according to embodiments of the disclosure.

DETAILED DESCRIPTION

Figure 1:
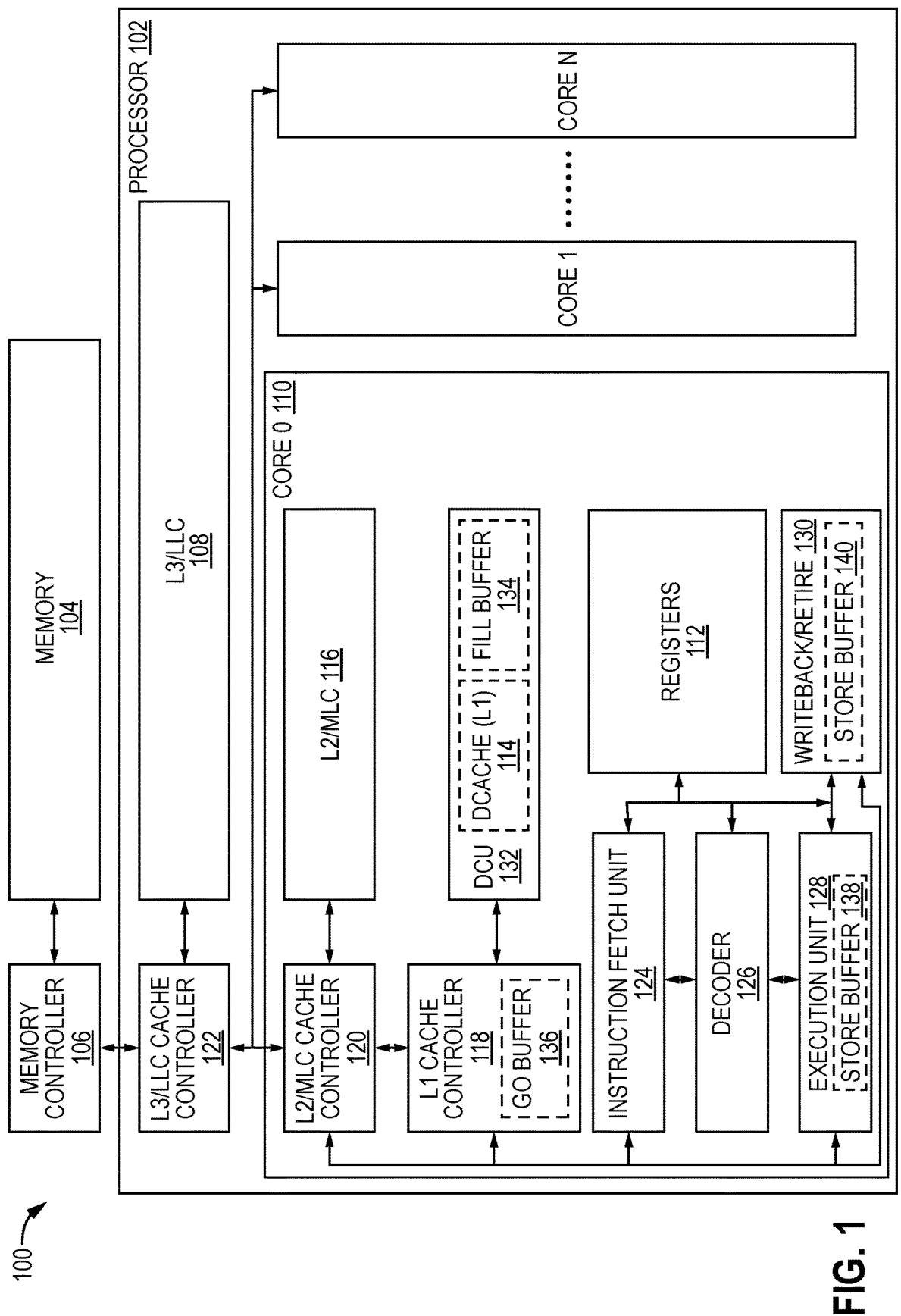
FIG. 1 illustrates a hardware processor coupled to memory according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor may operate on data (e.g., a cache line) stored in memory (e.g., a cache of a processor) of a computing system, e.g., in performing arithmetic or logic functions. A cache line may generally refer to a section (e.g., a sector) of memory (e.g., a cache) that is managed as a unit for coherence purposes. Data may be stored in a cache (e.g., of any level, such as, but not limited to, L3, L2, L3, etc.), system memory (e.g., separate from a processor), or combinations thereof. In certain embodiments, memory is shared by multiple cores of a processor or local (e.g., not shared) to each core of a processor. A cache (e.g., cache memory) may generally refer to a memory buffer inserted between one or more processor cores and a bus/interconnect therebetween, for example, the cache to store (e.g., hold) currently active copies of data (e.g., cache lines of data from system (e.g., main) memory). Cache may be local to each processor. Additionally or alternatively, a (e.g., next level of) cache may be shared by multiple processors, e.g., separate from each processor. Memory may be separate from any cache memory, e.g., system memory that is off-die relative to a processor core. In one embodiment, a cache line is a 64 byte sized section of memory, e.g., 64 byte granularity.

Cache (e.g., line) coherency may generally refer to each cache (e.g., cache memory) and/or other (e.g., system) memory in the coherence domain observing all modifications of that same cache data (e.g., a cache line, and more particularly, each instance of that cache line that is to contain the same data). For example, a modification may be said to be observed by a cache when any subsequent read would return the newly (e.g., current) written value. In certain embodiments, a cache controller (e.g., cache coherency controller) is included in a computing system to maintain cache coherency. In one embodiment, the cache controller is a cache controller circuit. Cache coherency may be maintained according to a cache coherence protocol, e.g., the four state modified (M), exclusive (E), shared (S), and invalid (I) (MESI) protocol or the five state modified (M), exclusive (E), shared (S), invalid (I), and forward (F) (MESIF) protocol. Cache controller(s) may provide, for multiple copies of a data item (e.g., stored in any memory), an update to other copies of the data item when one copy of that data item is changed, e.g., to ensure the data values of shared items (e.g., operands) are propagated throughout the computing system in a timely fashion.

In certain embodiments, a write may only be performed if the cache line to be written (e.g., that cache line being stored in multiple physical locations) is in the Modified or Exclusive state. In certain embodiments, if the cache line to be written is in the Shared state, all other cached copies must be invalidated first. In one embodiment, the invalidation is caused by a broadcast operation known as a Request For Ownership (RFO). In certain embodiments, a cache that holds a line in the Modified state must snoop (e.g., intercept) all attempted reads (e.g., from all of the other caches in the system) of the corresponding (e.g., main) memory location and insert the data that it holds. In one embodiment, this is done by forcing the read to back off (e.g., retry later), then writing the data to (e.g., main) memory and changing the cache line to the Shared state. In another embodiment, this is done by sending data from the Modified cache to the cache performing the read. In certain embodiments, snooping is only required for read misses (e.g., a coherency protocol that ensures that Modified cannot exist if any other cache can perform a read hit). In one embodiment, a cache that includes a cache line in the Shared state must listen for invalidate or request-for-ownership broadcasts from other caches, and discard the line (e.g., by moving it into Invalid state) on a match. In certain embodiments, the Modified and Exclusive states are always precise in that they match the true cache line ownership situation in the system. In certain embodiments, the Shared state may be imprecise, e.g., if another cache discards a Shared line, this cache may become the sole owner of that cache line, but it will not be promoted to Exclusive state. In one embodiment, other caches do not broadcast notices when they discard cache lines, and this cache could not use such notifications without maintaining a count of the number of shared copies. Thus, in certain embodiments, the Exclusive state is an opportunistic optimization, e.g., if the processor wants to modify a cache line that is in a Shared state, a memory (e.g., bus or interconnect) transaction is necessary to invalidate all other cached copies. In one embodiment, the Exclusive state enables modifying a cache line with no memory (e.g., bus or interconnect) transaction.

FIG. 1 illustrates a hardware processor 102 coupled to a memory 104 according to embodiments of the disclosure. In one embodiment, the memory is a system memory (e.g., dynamic random access memory (DRAM)). Memory controller 106 may be included, e.g., to manage memory requests between the processor 102 and memory 104. In one embodiment, memory controller 106 is to provide data (e.g., a cache line) for a miss in the cache(s) (e.g., miss in L3 or other last level cache (LLC) 108 of processor 102). Processor 102 may include one or more processor cores, e.g., 0 to N where N is a positive integer. In one embodiment, each of a plurality of processor cores have an instance of the circuitry, etc. depicted and/or discussed in reference to core 110 in FIG. 1.

Depicted core 110 includes a set of registers 112, a first level cache (level one (L1)) 114 (e.g., data cache (Dcache), and a level two (L2) or mid-level cache (MLC) 116. In some embodiments, as shown in FIG. 1, a processor 102 includes a next level (e.g., level three (L3) cache or last level cache (LLC) 108 (e.g., the last cache searched before a data item is fetched from memory 104) that is coupled to, and shared by, one or more (e.g., all) of the cores. In certain embodiments, each of L1 114, L2/MLC 116, and L3/LLC 108 caches are managed by a respective cache controller (188, 120, 122, respectively) (e.g., cache controller circuitry) to cache data (e.g., and/or instructions) according to a specified cache coherency, e.g., as discussed above. In certain embodiments, the instructions and data stored within the various processor caches are managed at the granularity of cache lines which may be a fixed size (e.g., 64, 128, 512, etc. Bytes in length). Core 110 further includes an instruction fetch unit 124 for fetching instructions (for example, from (e.g., main) memory 104 via memory controller 106 and/or from the shared LLC 108 via L3/LLC cache controller 122); a decoder 126 (e.g., decode circuit or decode unit) for decoding the instructions (e.g., decoding program instructions into micro-operations or "µops"); an execution unit 128 (e.g., execution circuit) for executing the decoded instructions; and a writeback/retire unit 130 (e.g., writeback/retire circuit) for retiring the instructions and writing back the results. Although separate cache controllers for each layer are depicted, it should be understood that a single cache controller that controls a plurality of (e.g., all) cache layers (e.g., and other components utilizing cache coherency) may be utilized. In certain embodiments, a core is an instance of core 890 in FIG. 8B.

Depicted core 110 in FIG. 1 includes a data cache unit 132. Data cache unit 132 may include a data (e.g., L1) cache 114 and/or fill buffer 134. In certain embodiments, the data cache unit 132 is to receive a request to perform a memory access (e.g., a store or load), for example, from execution unit 128 and/or writeback/retire unit 130. As one example, a processor (e.g., via execution of an instruction) may have a plurality of storage requests (e.g., to store a resultant of an operation(s) by instructions). A store buffer may be included. In one embodiment, execution unit 128 includes optional store buffer 138. In one embodiment, writeback/retirement unit 130 includes optional store buffer 140. In one embodiment, a store buffer (e.g., either of store buffer 138 or store buffer 140) maintains (e.g., serializes) stores (e.g., storage requests which may also include the payload to be stored at a target cache line) in (e.g., program) order (and not the order of execution, which may be out-of-order) to ensure in (e.g., program) order updates to the memory (e.g., caches). In certain embodiments, a processor is placed in total store order (TSO) mode to enable use of the store buffer(s), etc.

Store buffer may be a first in, first out buffer (FIFO), e.g., with the stores provided to the FIFO buffer in program order.

In certain embodiments, a store (e.g., store request) is sent from the generating component (e.g., execution unit) to a memory component (e.g., cache controller) to perform the store operation. In one embodiment, stores are sent to data cache unit 132, for example, to data cache (L1) 114 to check if there is a hit for the store. In one embodiment, a store request includes an identifier of a location (e.g., an address) to perform the store operation. In certain embodiments, a hit occurs for a cache when it is determined that the cache includes a copy of the data for the location.

In certain embodiments, a store request is sent to the data cache (DCache) 114, and if there is a miss (e.g., not a hit), then that store request is sent to fill buffer 134 for servicing. Fill buffer 134 (e.g., or a miss status handling register (MSHR)) may have one of its plurality of entries assigned to the missed store request, and a process of obtaining access to be able to write the data to the store location is begun. In one embodiment, a request for ownership (RFO) is sent (e.g., from the fill buffer) into the memory subsystem (e.g., to a cache that currently has write access for the location the data is to be stored to) and a confirmation response is sent back when the storage location for the miss is allowed to be written to. A confirmation response may be a confirmation value that indicates the cache 114 now has ownership over the other location (e.g., other cache) that does store data for the location, and the store request may now be serviced (e.g., by writing that data to a cache line in data cache 114 and propagating that data to any other caches that have instances of that cache line). Processor 102 may also include a globally observable (GO) buffer 136, which is depicted as being in the L1 cache controller 118. GO buffer 136 may be provided to keep track of the program order for the misses (e.g., store requests that did not hit in the data cache being targeted). In one embodiment, the information from the GO buffer 136 is then used to cause (e.g., guarantee) store updates to the targeted cache (e.g., cache 114) in program order. In certain embodiments, a "globally observable buffer" stores (e.g., in program order) data (e.g., storage requests) that is waiting to be made architecturally visible to all components sharing a memory subsystem, e.g., a globally observable store buffer (GoSB) for stores that are waiting to be made architecturally visible. In certain embodiments, a "globally observable buffer" stores (e.g., in program order) a list of all outstanding stores that wait for their "request for ownership" response (e.g., a response that indicates ownership that allows a store of data to a corresponding cache line).

In certain embodiments, when a plurality of stores that miss in the cache(s) is interleaved with a group of stores that hit in the cache(s,) the stores are serialized to ensure in (e.g., program) order updates to the memory subsystem (e.g., including other caches and/or memory 104). In one embodiment, a store that hits in the cache while an older (e.g., in program order) store is still outstanding (e.g. having a cache miss) has to wait in the store buffer (SB) and blocks younger stores from dispatching to the memory system. This may be referred to as the "store hit-after-miss" problem. Current embodiments herein solve that problem.

In certain embodiments, the reason for the stall is that cache updates are visible immediately, while the visibility of cache lines in a fill buffer (e.g., having entries for outstanding misses) can be controlled to enforce memory ordering. Cache updates can only be performed when all previous stores are visible in certain of these embodiments. In one embodiment where stores are dispatched from the store buffer in (e.g., program) order, a store that hits the cache and is stalled also causes all subsequent stores to be stalled. One possible solution is to use a prefetcher to attempt to prefetch cache lines that are going to be used by the stores, e.g., in order to increase the hit ratio and/or reduce the miss time. However, a prefetcher may not always issue the requests early enough, and when having a low priority on the dispatch port, it may often lose arbitration to higher priority agents and fail to issue a prefetch. In some embodiments, a STA prefetcher itself causes a hit-after-miss problem by bringing only some of the cache lines to the cache but not all. Another solution that was considered was to treat store cache hits as misses and allocate a fill buffer that will hold the data until all previous requests are visible, without actually requesting the cache line from higher cache (e.g., L2). Certain embodiments of this solution may be complex in terms of hardware design, and not deliver a performance improvement where it increases the pressure on the fill buffer. Certain embodiments herein remove the unnecessary delay incurred by stores after a sequence of older hit-miss stores and/or allow stores to fully utilize the parallelism that the memory system can provide.

In one embodiment, multiple stores that miss in the data cache unit (DCU) can be handled in parallel as long as the core has enough Fill Buffer (FB) entries (or MSHR entries), to buffer them. After the stores are observed in the (e.g., cache coherency) system, which can happen out-of-order, certain embodiments herein serialize stores according to the program order to ensure they update the memory system in the correct order. In other embodiments, the circuitry used to handle this serialization does not include stores that hit in the DCU currently. Certain embodiments herein extend this to also include stores that hit in the DCU so that younger stores following can be dispatched to the memory system instead of waiting in the store buffer (e.g., while still maintaining the total store order as expected).

Figure 2:
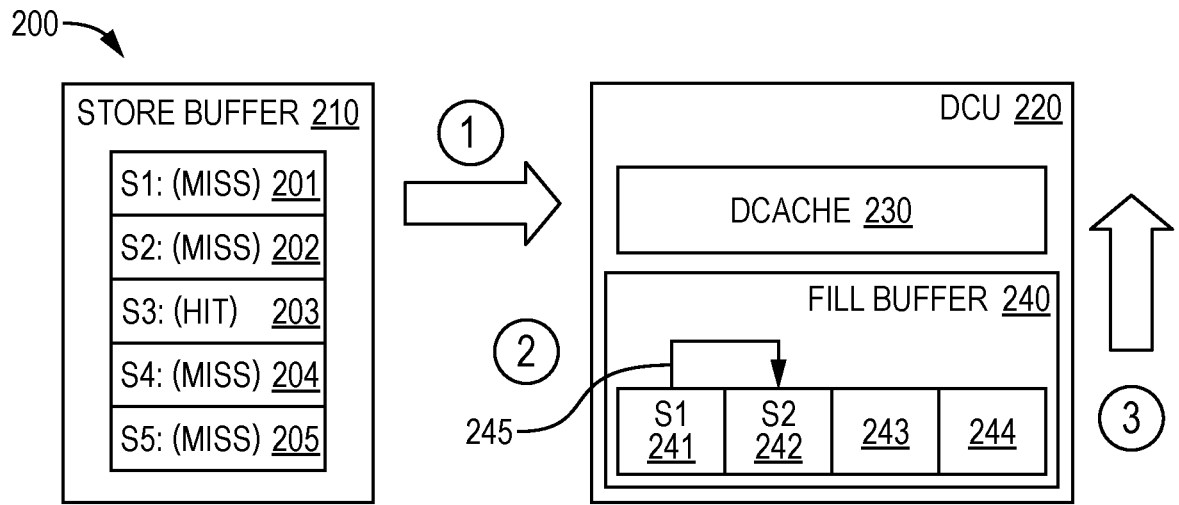
FIG. 2 illustrates a store buffer coupled to a data cache unit according to embodiments of the disclosure.

FIG. 2 illustrates a store buffer 210 coupled to a data cache unit (DCU) 220 according to embodiments of the disclosure. In certain embodiments, store buffer 210 is store buffer 138 or store buffer 140 in FIG. 1. In certain embodiments, store buffer 210 resides in a memory access unit (e.g., memory access unit 864 in FIG. 8B). In certain embodiments, data cache unit 220 is data cache unit 132 in FIG. 1. In certain embodiments, data cache unit 220 is data cache unit 874 in FIG. 8B.

Store buffer 210 includes a plurality of slots (201-205) for entries. Although 5 slots are shown, any plurality of slots may be utilized. Each slot of store buffer 210 may receive an outstanding storage request, e.g., from a requestor such as an execution unit or writeback/retirement unit, and store the storage requests in program order. Depicted storage request 1 (S1) stored in slot 201 will be a miss when the data cache unit 220 checks the data cache 230 for the presence of the cache line (e.g., cache indicator) where data is to be stored for that request, storage request 2 (S2) stored in slot 202 will be a miss when the data cache unit 220 checks the data cache 230 for the presence of the cache line (e.g., cache indicator) where data is to be stored for that request, storage request 3 (S3) stored in slot 203 will be a hit when the data cache unit 220 checks the data cache 230 for the presence of the cache line (e.g., cache indicator) where data is to be stored for that request, storage request 4 (S4) stored in slot 204 will be a miss when the data cache unit 220 checks the data cache 230 for the presence of the cache line (e.g., cache indicator) where data is to be stored for that request, and storage request 5 (S5) stored in slot 201 will be a miss when the data cache unit 220 checks the data cache 230 for the presence of the cache line (e.g., cache indicator) where data is to be stored for that request. Note that although they are labeled "hit" or "miss", the store buffer may not have knowledge of this, e.g., the "hit" or "miss" information may be generated by the data cache unit 220 (e.g., which is separate from the store buffer).

FIG. 2 shows one embodiment of handling stores post retirement, e.g., senior stores. Stores (e.g., S1-S5 here) (e.g., after stores become senior) are dispatched to the data cache unit 220 in order (e.g., step 1 as indicated by a circled one). If a store misses the data cache unit 220 in this embodiment, it allocates an entry in the fill buffer 240 (e.g., step 2 as indicated by a circled two), and the fill buffer 240 (e.g., as caused by a cache controller) sends a Request For Ownership (RFO) to the remaining memory system (e.g., L3/LLC 108 in FIG. 1). Depicted fill buffer 240 includes four slots (241-244) for miss entries, although any plurality may be utilized.

Responses for those RFOs can come back out-of-order (e.g., out of program order). To guarantee stores updates to the data cache 230 (DCache) in order, in certain embodiments, they are assembled using a GO buffer (GOB) (e.g., linked list as depicted by the arrow 245 in FIG. 1). In certain embodiment, the linked list tracks a current, oldest (e.g., head) element in the GOB linked list, and the next oldest element, then any next oldest element, etc. In one embodiment, the head of the GOB linked list refers to the slot storing the oldest outstanding store (in this example slot 241 for store S1). As long as stores are made visible according to the order in the GOB (e.g., step 3 as indicated by a circled three), order (e.g., total store order) is maintained in certain embodiments.

FIG. 2 also shows a sequence of stores, which includes the following misses in the DCU (S1, S2, S4, and S5), and a store that hits in the DCU (S3). As explained above, S1 and S2 are allocated slots in the fill buffer 240 (e.g., slot 241 and 242, respectively) and corresponding RFO requests will be sent from the fill buffer 240. In one embodiment, while S1 and S2's RFOs are still outstanding, S3 is dispatched to the DCU 220 and finds that it hits in the DCU 220 (e.g., in cache 230). However, in certain embodiments, it cannot update the cache 230, otherwise the store order is violated. As a result, S3 has to wait in the Store Buffer 210 in this embodiment and prevents subsequent stores (e.g., S4 and S5) from being dispatched to the fill buffer 240 even though the FB still has available (e.g., unallocated) slots (e.g., slot 243 and slot 244).

Figure 3:
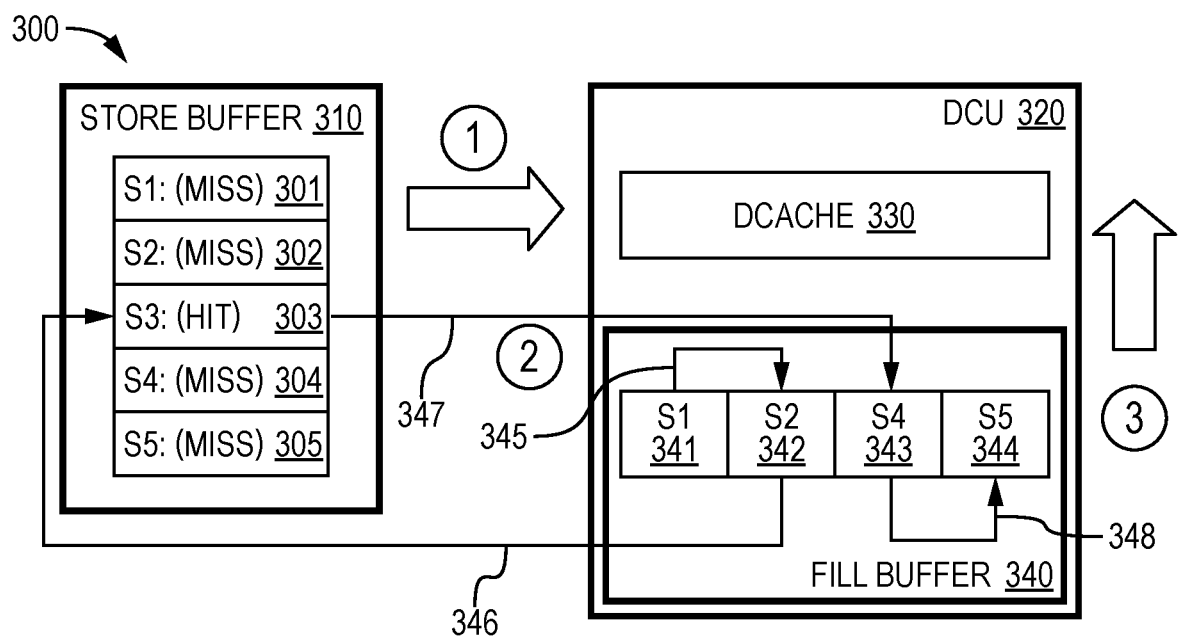
FIG. 3 illustrates a store buffer coupled to a data cache unit according to embodiments of the disclosure.

To solve this problem, certain embodiments herein extend the GOB (e.g., encoding) to also include the store buffer entries (e.g., as shown in FIG. 3). In one embodiment, each store buffer entry is augmented with one additional bit which indicates whether the entry (e.g., S3) needs a redispatch to the DCU (e.g., where that redispatch will then cause that storage request that is a hit to have its data stored into the cache line in the cache).

FIG. 3 illustrates a store buffer 310 coupled to a data cache unit (DCU) 320 according to embodiments of the disclosure. In certain embodiments, store buffer 210 is store buffer 138 or store buffer 140 in FIG. 1. In certain embodiments, store buffer 210 resides in a memory access unit (e.g., memory access unit 864 in FIG. 8B). In certain embodiments, data cache unit 220 is data cache unit 132 in FIG. 1. In certain embodiments, data cache unit 220 is data cache unit 874 in FIG. 8B.

Store buffer 310 includes a plurality of slots (301-305) for entries. Although 5 slots are shown, any plurality of slots may be utilized. Each slot of store buffer 310 may receive an outstanding storage request, e.g., from a requestor such as an execution unit or writeback/retirement unit, and store the storage requests in program order. Depicted storage request 1 (S1) stored in slot 301 will be a miss when the data cache unit 320 checks the data cache 330 for the presence of the cache line (e.g., cache indicator) where data is to be stored for that request, storage request 3 (S2) stored in slot 302 will be a miss when the data cache unit 320 checks the data cache 330 for the presence of the cache line (e.g., cache indicator) where data is to be stored for that request, storage request 3 (S3) stored in slot 303 will be a hit when the data cache unit 320 checks the data cache 330 for the presence of the cache line (e.g., cache indicator) where data is to be stored for that request, storage request 4 (S4) stored in slot 304 will be a miss when the data cache unit 320 checks the data cache 330 for the presence of the cache line (e.g., cache indicator) where data is to be stored for that request, and storage request 5 (S5) stored in slot 301 will be a miss when the data cache unit 320 checks the data cache 330 for the presence of the cache line (e.g., cache indicator) where data is to be stored for that request. Note that although they are labeled "hit" or "miss", the store buffer may not have knowledge of this, e.g., the "hit" or "miss" information may be generated by the data cache unit 320 (e.g., which is separate from the store buffer).

FIG. 3 shows one embodiment of handling stores post retirement, e.g., senior stores. Stores (e.g., S1-S5 here) (e.g., after stores become senior) are dispatched to the data cache unit 320 in order (e.g., step 1 as indicated by a circled one). If a store misses the data cache unit 320 in this embodiment, it allocates an entry in the fill buffer 340 (e.g., step 3 as indicated by a circled two), and the fill buffer 340 (e.g., as caused by a cache controller) sends a Request For Ownership (RFO) to the remaining memory system (e.g., L3/LLC 108 in FIG. 1). Depicted fill buffer 340 includes four slots (341-344) for miss entries, although any plurality may be utilized.

Responses for those RFOs can come back out-of-order (e.g., out of program order). To guarantee stores updates to the data cache 330 (DCache) in order, in certain embodiments, they are assembled using a GO buffer (GOB) (e.g., linked list 345-347 as depicted by the arrows in FIG. 1). In certain embodiment, the linked list tracks a current, oldest (e.g., head) element in the GOB linked list, and the next oldest element, etc. In one embodiment, the head of the GOB linked list refers to the slot storing the oldest outstanding store (in this example slot 341 for store S1). As long as stores are made visible according to the order in the GOB (e.g., step 3 as indicated by a circled three), order (e.g., total store order) is maintained in certain embodiments.

FIG. 3 also shows a sequence of stores, which includes the following misses in the DCU (S1, S2, S4, and S5), and a store that hits in the DCU (S3). As explained above, S1 and S2 are allocated slots in the fill buffer 340 (e.g., slot 341 and 342, respectively) and corresponding RFO requests will be sent from the fill buffer 340. In one embodiment, while S1 and S2's RFOs are still outstanding, S3 is dispatched to the DCU 320 and finds that it hits in the DCU 320 (e.g., in cache 330). However, in certain embodiments, it cannot update the cache 330, otherwise the store order is violated. As a result, S3 has to wait in the Store Buffer 310 in this embodiment, but instead of preventing subsequent stores (e.g., S4 and S5) from being dispatched to the fill buffer 340 even though the FB still has available slots (e.g., slot 343 and slot 344), subsequent stores (for example, stores S4 and S5 are sent, e.g., sent consecutively with S4 followed by S5) to DCU 320 after the GOB (e.g., linked list 345-347) is updated to also indicate that S3 is in the store buffer 310 (e.g., and not in the fill buffer 340 for misses).

In one embodiment, if S3 (as a hit) was placed into fill buffer 340, it would consume a fill buffer slot that may otherwise be used to service a miss storage request. In another embodiment, if S3 (as a hit) was placed into fill buffer 340, it may violate the functioning principals of a fill buffer that is to send a RFO for a miss, and then update the cache 330 when ownership has been established. Instead, certain embodiments herein mark each store buffer entry (e.g., with a high value in a an additional bit field) which indicates whether the entry (e.g., S3) needs a redispatch to the DCU (e.g., where that redispatch will then cause that storage request that is a hit to have its data stored into the cache line in the cache 330). Thus as depicted, for storage request S2 in slot 342 in fill buffer 340, the linked list is updated to point 346 to slot 303 in store buffer 310 for storage request S3 (and does not point to entry 343 as may be hardwired into fill buffer 240 in FIG. 2). In one embodiment, the next storage request S4 is then dispatched to DCU 320, it is determined it is a miss in cache 330, and thus the storage request S4 is stored into slot 343 of fill buffer 340 for servicing, and for entry S3 in slot 303 in store buffer, the linked list is updated to point 347 to slot 343 in fill buffer 340 for storage request S4. In one embodiment, the next storage request S5 is then dispatched to DCU 320, it is determined it is a miss in cache 330, and thus the storage request S5 is stored into slot 344 of fill buffer 340 for servicing, and for entry S4 in slot 343 in fill buffer 340, the linked list is updated to point 348 to slot 344 in fill buffer 340 for storage request S5. In another embodiment, if S5 was instead a hit, it may be marked accordingly in the store buffer (e.g., by the bit discussed above) and the linked list set accordingly.

In one embodiment, upon a cache hit for a store (e.g., storage request), the store will be allowed to update the cache only if it is the head of the linked list (e.g., as the oldest store in the store buffer), otherwise it is marked as needing a redispatch to the data cache unit (e.g., "need_GO_redispatch" indication). However, in certain embodiments herein, subsequent stores following this are still allowed to dispatch to the DCU, and when a store misses in data cache unit and allocates a fill buffer entry, its fill buffer entry is added to the GOB (e.g., linked list).

In one embodiment, the GOB head (e.g., oldest entry) indicates which store is allowed to update the cache (DCache) next. In this embodiment, (i) when the GOB head points to a fill buffer entry, this fill buffer entry is marked as globally observed, and the GOB head is set to point to the next element in the list, and (ii) when the GOB head points to a store buffer entry, it wakes up all following consecutive stores in the list as long as there are no fill buffer entries in between so that they can be redispatched. In certain embodiments, it is likely that these stores will hit the cache again. However, if they miss in certain embodiments, they will allocate a fill buffer entry at that time and place it in at the head of the GOB. In this case, subsequent cache hits will be stalled in the SB and wait for a GO of the new requests.

Thus, the embodiments herein allow stores to dispatch to the memory subsystem opportunistically and maximize the parallelism that the memory system can provide as a result.

Figure 4:
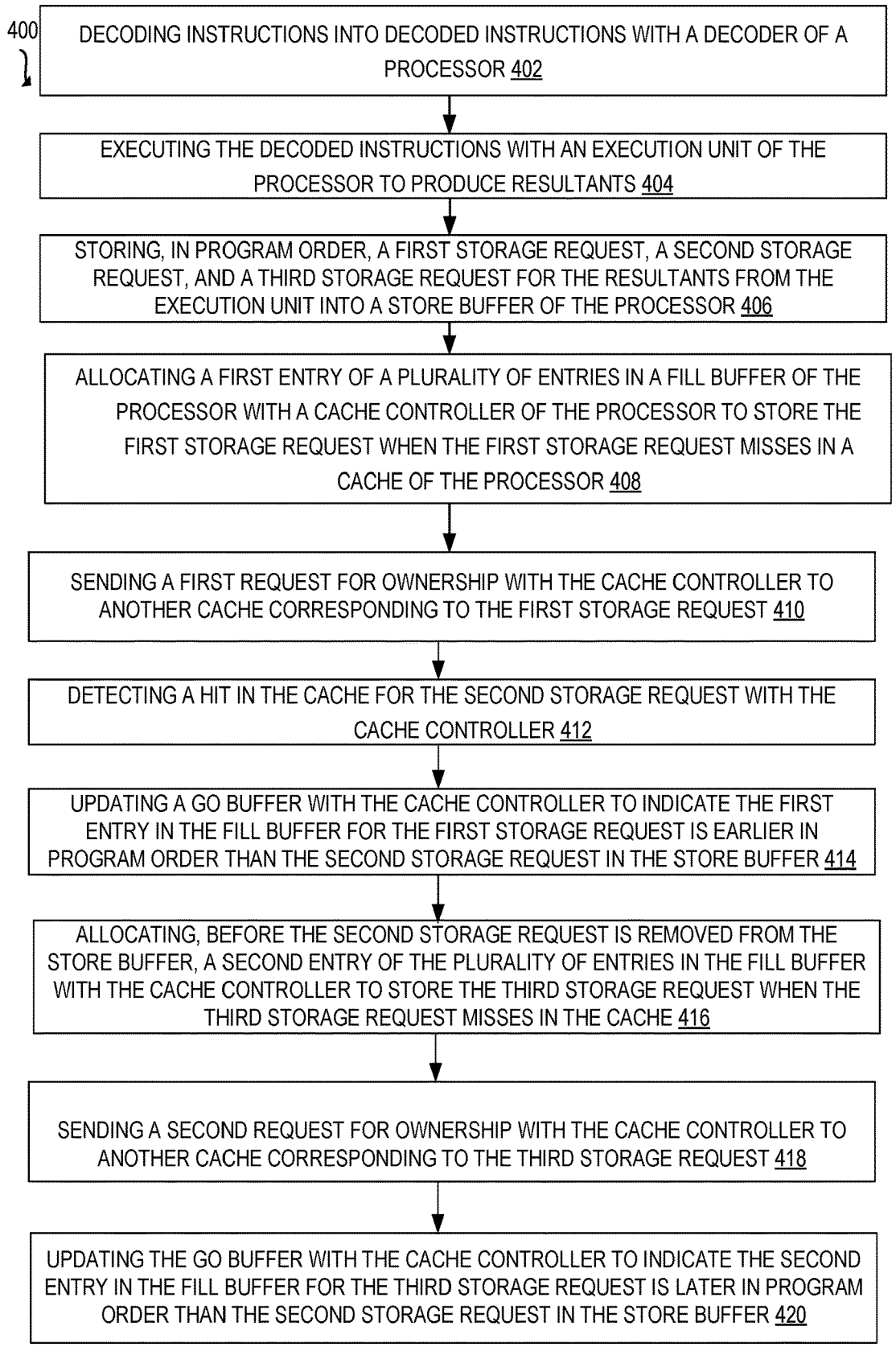
FIG. 4 illustrates a flow diagram according to embodiments of the disclosure.

FIG. 4 illustrates a flow diagram 400 according to embodiments of the disclosure. Depicted flow 400 includes decoding instructions into decoded instructions with a decoder of a processor 402; executing the decoded instructions with an execution unit of the processor to produce resultants 404; storing, in program order, a first storage request, a second storage request, and a third storage request for the resultants from the execution unit into a store buffer of the processor 406; allocating a first entry of a plurality of entries in a fill buffer of the processor with a cache controller of the processor to store the first storage request when the first storage request misses in a cache of the processor 408; sending a first request for ownership with the cache controller to another cache corresponding to the first storage request 410; detecting a hit in the cache for the second storage request with the cache controller 412; updating a globally observable buffer with the cache controller to indicate the first entry in the fill buffer for the first storage request is earlier in program order than the second storage request in the store buffer 414; allocating, before the second storage request is removed from the store buffer, a second entry of the plurality of entries in the fill buffer with the cache controller to store the third storage request when the third storage request misses in the cache 416; sending a second request for ownership with the cache controller to another cache corresponding to the third storage request 4818; and updating the globally observable buffer with the cache controller to indicate the second entry in the fill buffer for the third storage request is later in program order than the second storage request in the store buffer 420.

At least some embodiments of the disclosed technologies can be described in view of the following examples:

Example 1

An apparatus comprising:
a cache;
a decoder to decode instructions into decoded instructions;
an execution unit to execute the decoded instructions to produce resultants;
a store buffer to store, in program order, a first storage request, a second storage request, and a third storage request for the resultants from the execution unit;
a fill buffer; and
a cache controller to:
  allocate a first entry of a plurality of entries in the fill buffer to store the first storage request when the first storage request misses in the cache,
  send a first request for ownership to another cache corresponding to the first storage request,
  detect a hit in the cache for the second storage request,
  update a globally observable buffer to indicate the first entry in the fill buffer for the first storage request is earlier in program order than the second storage request in the store buffer,
  allocate, before the second storage request is removed from the store buffer, a second entry of the plurality of entries in the fill buffer to store the third storage request when the third storage request misses in the cache,
  send a second request for ownership to another cache corresponding to the third storage request, and
  update the globally observable buffer to indicate the second entry in the fill buffer for the third storage request is later in program order than the second storage request in the store buffer.

Example 2

The apparatus of example 1, wherein the cache controller is to send the second request for ownership to the another cache corresponding to the third storage request before the second storage request is removed from the store buffer.

Example 3

The apparatus of example 1, wherein the cache controller is to remove the first entry in the fill buffer for the first storage request and remove the first storage request from the store buffer when a first confirmation response is received for the first request for ownership.

Example 4

The apparatus of example 3, wherein a second confirmation response for the second request for ownership arrives before the first confirmation response for the first request for ownership.

Example 5

The apparatus of example 1, wherein a format of each entry in the store buffer includes a bit to indicate when that entry is to be redispatched to the cache.

Example 6

The apparatus of example 1, wherein the globally observable buffer is a linked list, and the cache controller updates the globally observable buffer to indicate the first entry in the fill buffer for the first storage request is earlier in program order than the second storage request in the store buffer and to indicate the second entry in the fill buffer for the third storage request is later in program order than the second storage request in the store buffer comprises linking the first entry in the fill buffer for the first storage request to a corresponding entry in the store buffer for the second storage request, and linking the corresponding entry in the store buffer for the second storage request to the second entry in the fill buffer for the third storage request.

Example 7

The apparatus of example 6, wherein a storage request for a hit in the cache is only to write to the cache when the storage request is at a head of the linked list.

Example 8

The apparatus of example 1, wherein the fill buffer does not include an entry for a hit in the cache.

Example 9

A method comprising:
decoding instructions into decoded instructions with a decoder of a processor;
executing the decoded instructions with an execution unit of the processor to produce resultants;
storing, in program order, a first storage request, a second storage request, and a third storage request for the resultants from the execution unit into a store buffer of the processor;
allocating a first entry of a plurality of entries in a fill buffer of the processor with a cache controller of the processor to store the first storage request when the first storage request misses in a cache of the processor;
sending a first request for ownership with the cache controller to another cache corresponding to the first storage request;
detecting a hit in the cache for the second storage request with the cache controller;
updating a globally observable buffer with the cache controller to indicate the first entry in the fill buffer for the first storage request is earlier in program order than the second storage request in the store buffer;
allocating, before the second storage request is removed from the store buffer, a second entry of the plurality of entries in the fill buffer with the cache controller to store the third storage request when the third storage request misses in the cache;
sending a second request for ownership with the cache controller to another cache corresponding to the third storage request; and
updating the globally observable buffer with the cache controller to indicate the second entry in the fill buffer for the third storage request is later in program order than the second storage request in the store buffer.

Example 10

The method of example 9, wherein the sending of the second request for ownership with the cache controller to the another cache corresponding to the third storage request is before the second storage request is removed from the store buffer.

Example 11

The method of example 9, further comprising the cache controller removing the first entry in the fill buffer for the first storage request and removing the first storage request from the store buffer when a first confirmation response is received for the first request for ownership.

Example 12

The method of example 11, wherein a second confirmation response for the second request for ownership arrives before the first confirmation response for the first request for ownership.

Example 13

The method of example 9, wherein a format of each entry in the store buffer includes a bit to indicate when that entry is to be redispatched to the cache.

Example 14

The method of example 9, wherein the globally observable buffer is a linked list, and the updating the globally observable buffer to indicate the first entry in the fill buffer for the first storage request is earlier in program order than the second storage request in the store buffer and to indicate the second entry in the fill buffer for the third storage request is later in program order than the second storage request in the store buffer comprises the cache controller linking the first entry in the fill buffer for the first storage request to a corresponding entry in the store buffer for the second storage request, and linking the corresponding entry in the store buffer for the second storage request to the second entry in the fill buffer for the third storage request.

Example 15

The method of example 14, wherein a storage request for a hit in the cache only writes to the cache when the storage request is at a head of the linked list.

Example 16

The method of example 9, wherein the fill buffer does not include an entry for a hit in the cache.

Example 17

A non-transitory machine readable medium that stores code that when executed by a machine causes the machine to perform a method comprising:
decoding instructions into decoded instructions with a decoder of a processor;
executing the decoded instructions with an execution unit of the processor to produce resultants; storing, in program order, a first storage request, a second storage request, and a third storage request for the resultants from the execution unit into a store buffer of the processor;
allocating a first entry of a plurality of entries in a fill buffer of the processor with a cache controller of the processor to store the first storage request when the first storage request misses in a cache of the processor;
sending a first request for ownership with the cache controller to another cache corresponding to the first storage request;
detecting a hit in the cache for the second storage request with the cache controller; updating a globally observable buffer with the cache controller to indicate the first entry in the fill buffer for the first storage request is earlier in program order than the second storage request in the store buffer;
allocating, before the second storage request is removed from the store buffer, a second entry of the plurality of entries in the fill buffer with the cache controller to store the third storage request when the third storage request misses in the cache;
sending a second request for ownership with the cache controller to another cache corresponding to the third storage request; and
updating the globally observable buffer with the cache controller to indicate the second entry in the fill buffer for the third storage request is later in program order than the second storage request in the store buffer.

Example 18

The non-transitory machine readable medium of example 17, wherein the sending of the second request for ownership with the cache controller to the another cache corresponding to the third storage request is before the second storage request is removed from the store buffer.

Example 19

The non-transitory machine readable medium of example 17, further comprising the cache controller removing the first entry in the fill buffer for the first storage request and removing the first storage request from the store buffer when a first confirmation response is received for the first request for ownership.

Example 20

The non-transitory machine readable medium of example 19, wherein a second confirmation response for the second request for ownership arrives before the first confirmation response for the first request for ownership.

Example 21

The non-transitory machine readable medium of example 17, wherein a format of each entry in the store buffer includes a bit to indicate when that entry is to be redispatched to the cache.

Example 22

The non-transitory machine readable medium of example 17, wherein the globally observable buffer is a linked list, and the updating the globally observable buffer to indicate the first entry in the fill buffer for the first storage request is earlier in program order than the second storage request in the store buffer and to indicate the second entry in the fill buffer for the third storage request is later in program order than the second storage request in the store buffer comprises the cache controller linking the first entry in the fill buffer for the first storage request to a corresponding entry in the store buffer for the second storage request, and linking the corresponding entry in the store buffer for the second storage request to the second entry in the fill buffer for the third storage request.

Example 23

The non-transitory machine readable medium of example 22, wherein a storage request for a hit in the cache only writes to the cache when the storage request is at a head of the linked list.

Example 24

The non-transitory machine readable medium of example 17, wherein the fill buffer does not include an entry for a hit in the cache.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 5A:
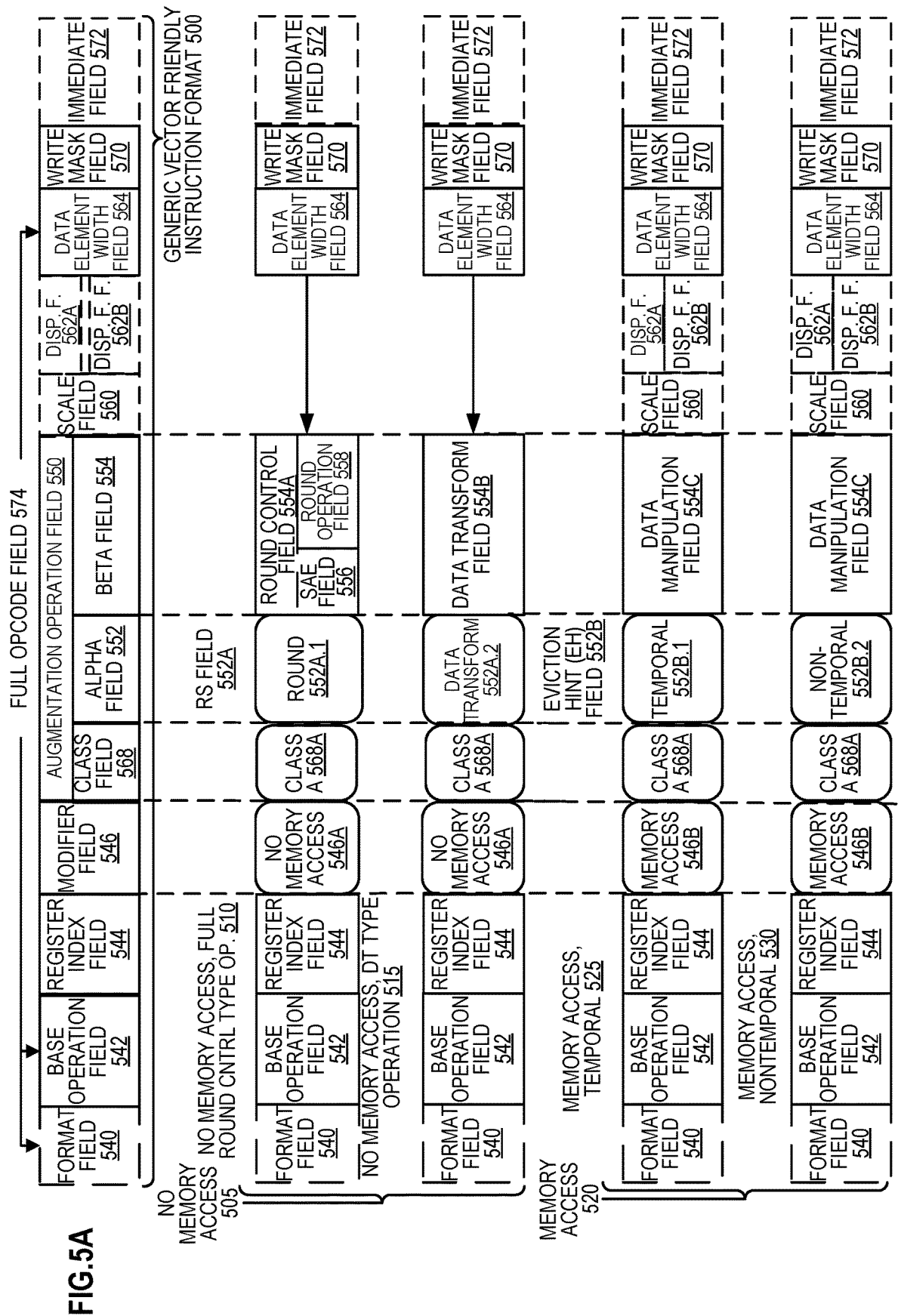
FIG. 5A is a block diagram illustrating a generic vector friendly instruction format and class A instruction templates thereof according to embodiments of the disclosure.
Figure 5B:
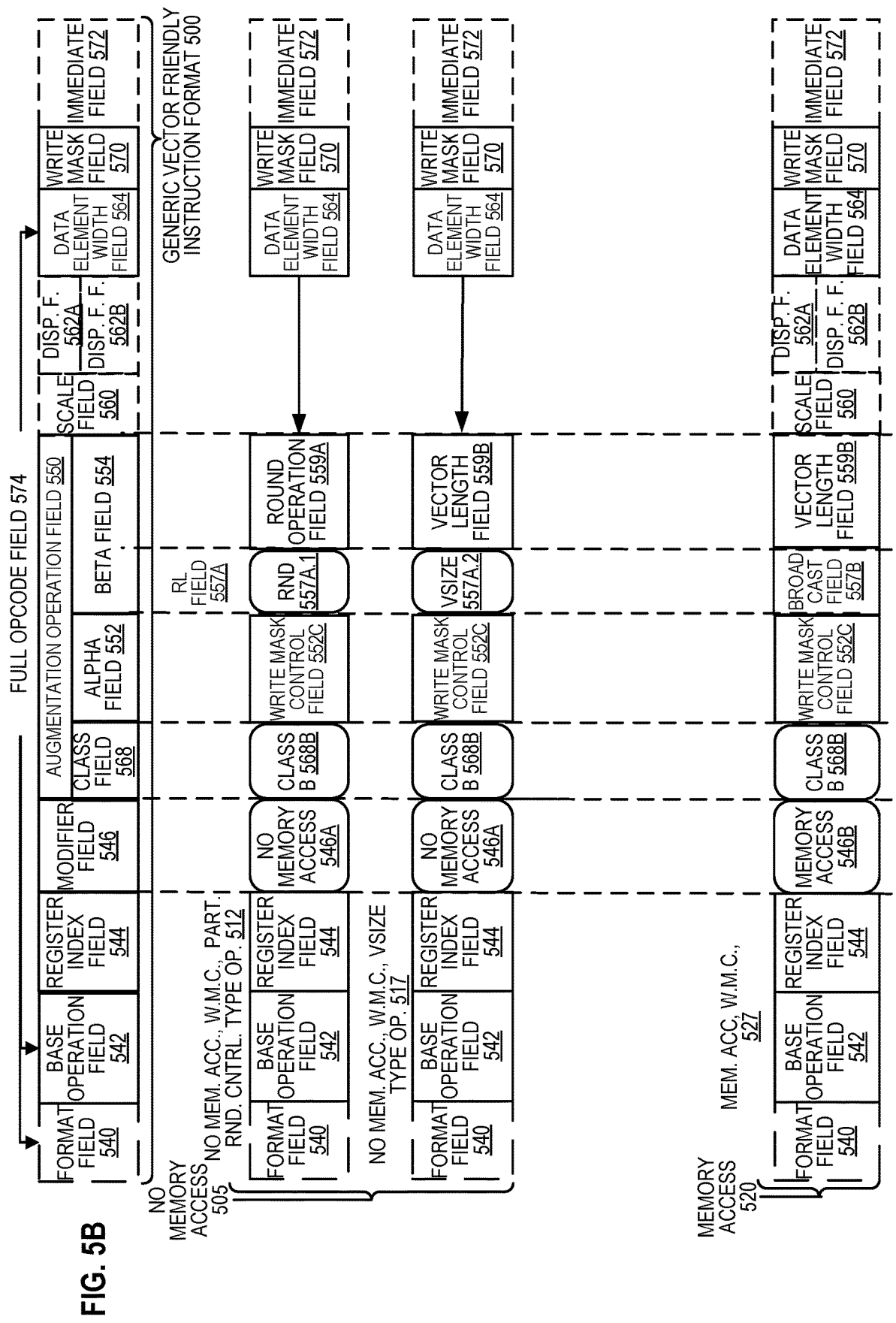
FIG. 5B is a block diagram illustrating the generic vector friendly instruction format and class B instruction templates thereof according to embodiments of the disclosure.

FIGS. 5A-5B are block diagrams illustrating a generic vector friendly instruction format and instruction templates thereof according to embodiments of the disclosure. FIG. 5A is a block diagram illustrating a generic vector friendly instruction format and class A instruction templates thereof according to embodiments of the disclosure; while FIG. 5B is a block diagram illustrating the generic vector friendly instruction format and class B instruction templates thereof according to embodiments of the disclosure. Specifically, a generic vector friendly instruction format 500 for which are defined class A and class B instruction templates, both of which include no memory access 505 instruction templates and memory access 520 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 5A include: 1) within the no memory access 505 instruction templates there is shown a no memory access, full round control type operation 510 instruction template and a no memory access, data transform type operation 515 instruction template; and 2) within the memory access 520 instruction templates there is shown a memory access, temporal 525 instruction template and a memory access, non-temporal 530 instruction template. The class B instruction templates in FIG. 5B include: 1) within the no memory access 505 instruction templates there is shown a no memory access, write mask control, partial round control type operation 512 instruction template and a no memory access, write mask control, vsize type operation 517 instruction template; and 2) within the memory access 520 instruction templates there is shown a memory access, write mask control 527 instruction template.

The generic vector friendly instruction format 500 includes the following fields listed below in the order illustrated in FIGS. 5A-5B.

Format field 540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 542—its content distinguishes different base operations.

Register index field 544—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 546—its content distinguishes occurrences of instructions in the generic vector instruction format that specify memory access from those that do not; that is, between no memory access 505 instruction templates and memory access 520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 550—its content distinguishes which one of a variety of different operations to be performed in addition to the base operation. This field is context specific. In one embodiment of the disclosure, this field is divided into a class field 568, an alpha field 552, and a beta field 554. The augmentation operation field 550 allows common groups of operations to be performed in a single instruction rather than 2, 3, or 4 instructions.

Scale field 560—its content allows for the scaling of the index field's content for memory address generation (e.g., for address generation that uses $2^{scale}$*index+base).

Displacement Field 562A—its content is used as part of memory address generation (e.g., for address generation that uses $2^{scale}$*index+base+displacement).

Displacement Factor Field 562B (note that the juxtaposition of displacement field 562A directly over displacement factor field 562B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 574 (described later herein) and the data manipulation field 554C. The displacement field 562A and the displacement factor field 562B are optional in the sense that they are not used for the no memory access 505 instruction templates and/or different embodiments may implement only one or none of the two.

Data element width field 564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 570 allows for partial vector operations, including loads, stores, arithmetic, logical, etc. While embodiments of the disclosure are described in which the write mask field's 570 content selects one of a number of write mask registers that contains the write mask to be used (and thus the write mask field's 570 content indirectly identifies that masking to be performed), alternative embodiments instead or additional allow the mask write field's 570 content to directly specify the masking to be performed.

Immediate field 572—its content allows for the specification of an immediate. This field is optional in the sense that is it not present in an implementation of the generic vector friendly format that does not support immediate and it is not present in instructions that do not use an immediate.

Class field 568—its content distinguishes between different classes of instructions. With reference to FIGS. 5A-B, the contents of this field select between class A and class B instructions. In FIGS. 5A-B, rounded corner squares are used to indicate a specific value is present in a field (e.g., class A 568A and class B 568B for the class field 568 respectively in FIGS. 5A-B).

Instruction Templates of Class A

In the case of the non-memory access 505 instruction templates of class A, the alpha field 552 is interpreted as an RS field 552A, whose content distinguishes which one of the different augmentation operation types are to be performed (e.g., round 552A.1 and data transform 552A.2 are respectively specified for the no memory access, round type operation 510 and the no memory access, data transform type operation 515 instruction templates), while the beta field 554 distinguishes which of the operations of the specified type is to be performed. In the no memory access 505 instruction templates, the scale field 560, the displacement field 562A, and the displacement scale filed 562B are not present.

No-Memory Access Instruction Templates—Full Round Control Type Operation

In the no memory access full round control type operation 510 instruction template, the beta field 554 is interpreted as a round control field 554A, whose content(s) provide static rounding. While in the described embodiments of the disclosure the round control field 554A includes a suppress all floating point exceptions (SAE) field 556 and a round operation control field 558, alternative embodiments may support may encode both these concepts into the same field or only have one or the other of these concepts/fields (e.g., may have only the round operation control field 558).

SAE field 556—its content distinguishes whether or not to disable the exception event reporting; when the SAE field's 556 content indicates suppression is enabled, a given instruction does not report any kind of floating-point exception flag and does not raise any floating point exception handler.

Round operation control field 558—its content distinguishes which one of a group of rounding operations to perform (e.g., Round-up, Round-down, Round-towards-zero and Round-to-nearest). Thus, the round operation control field 558 allows for the changing of the rounding mode on a per instruction basis. In one embodiment of the disclosure where a processor includes a control register for specifying rounding modes, the round operation control field's 550 content overrides that register value.

No Memory Access Instruction Templates—Data Transform Type Operation

In the no memory access data transform type operation 515 instruction template, the beta field 554 is interpreted as a data transform field 554B, whose content distinguishes which one of a number of data transforms is to be performed (e.g., no data transform, swizzle, broadcast).

In the case of a memory access 520 instruction template of class A, the alpha field 552 is interpreted as an eviction hint field 552B, whose content distinguishes which one of the eviction hints is to be used (in FIG. 5A, temporal 552B.1 and non-temporal 552B.2 are respectively specified for the memory access, temporal 525 instruction template and the memory access, non-temporal 530 instruction template), while the beta field 554 is interpreted as a data manipulation field 554C, whose content distinguishes which one of a number of data manipulation operations (also known as primitives) is to be performed (e.g., no manipulation; broadcast; up conversion of a source; and down conversion of a destination). The memory access 520 instruction templates include the scale field 560, and optionally the displacement field 562A or the displacement scale field 562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 552 is interpreted as a write mask control (Z) field 552C, whose content distinguishes whether the write masking controlled by the write mask field 570 should be a merging or a zeroing.

In the case of the non-memory access 505 instruction templates of class B, part of the beta field 554 is interpreted as an RL field 557A, whose content distinguishes which one of the different augmentation operation types are to be performed (e.g., round 557A.1 and vector length (VSIZE) 557A.2 are respectively specified for the no memory access, write mask control, partial round control type operation 512 instruction template and the no memory access, write mask control, VSIZE type operation 517 instruction template), while the rest of the beta field 554 distinguishes which of the operations of the specified type is to be performed. In the no memory access 505 instruction templates, the scale field 560, the displacement field 562A, and the displacement scale filed 562B are not present.

In the no memory access, write mask control, partial round control type operation 510 instruction template, the rest of the beta field 554 is interpreted as a round operation field 559A and exception event reporting is disabled (a given instruction does not report any kind of floating-point exception flag and does not raise any floating point exception handler).

Round operation control field 559A—just as round operation control field 558, its content distinguishes which one of a group of rounding operations to perform (e.g., Round-up, Round-down, Round-towards-zero and Round-to-nearest). Thus, the round operation control field 559A allows for the changing of the rounding mode on a per instruction basis. In one embodiment of the disclosure where a processor includes a control register for specifying rounding modes, the round operation control field's 550 content overrides that register value.

In the no memory access, write mask control, VSIZE type operation 517 instruction template, the rest of the beta field 554 is interpreted as a vector length field 559B, whose content distinguishes which one of a number of data vector lengths is to be performed on (e.g., 128, 256, or 512 byte).

In the case of a memory access 520 instruction template of class B, part of the beta field 554 is interpreted as a broadcast field 557B, whose content distinguishes whether or not the broadcast type data manipulation operation is to be performed, while the rest of the beta field 554 is interpreted the vector length field 559B. The memory access 520 instruction templates include the scale field 560, and optionally the displacement field 562A or the displacement scale field 562B.

With regard to the generic vector friendly instruction format 500, a full opcode field 574 is shown including the format field 540, the base operation field 542, and the data element width field 564. While one embodiment is shown where the full opcode field 574 includes all of these fields, the full opcode field 574 includes less than all of these fields in embodiments that do not support all of them. The full opcode field 574 provides the operation code (opcode).

The augmentation operation field 550, the data element width field 564, and the write mask field 570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 6 is a block diagram illustrating an exemplary specific vector friendly instruction format according to embodiments of the disclosure. FIG. 6 shows a specific vector friendly instruction format 600 that is specific in the sense that it specifies the location, size, interpretation, and order of the fields, as well as values for some of those fields. The specific vector friendly instruction format 600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 5 into which the fields from FIG. 6 map are illustrated.

It should be understood that, although embodiments of the disclosure are described with reference to the specific vector friendly instruction format 600 in the context of the generic vector friendly instruction format 500 for illustrative purposes, the disclosure is not limited to the specific vector friendly instruction format 600 except where claimed. For example, the generic vector friendly instruction format 500 contemplates a variety of possible sizes for the various fields, while the specific vector friendly instruction format 600 is shown as having fields of specific sizes. By way of specific example, while the data element width field 564 is illustrated as a one bit field in the specific vector friendly instruction format 600, the disclosure is not so limited (that is, the generic vector friendly instruction format 500 contemplates other sizes of the data element width field 564).

The generic vector friendly instruction format 500 includes the following fields listed below in the order illustrated in FIG. 6A.

EVEX Prefix (Bytes 0-3) 602—is encoded in a four-byte form.

Format Field 540 (EVEX Byte 0, bits [7:0])—the first byte (EVEX Byte 0) is the format field 540 and it contains 0x62 (the unique value used for distinguishing the vector friendly instruction format in one embodiment of the disclosure).

The second-fourth bytes (EVEX Bytes 1-3) include a number of bit fields providing specific capability.

REX field 605 (EVEX Byte 1, bits [7-5])—consists of a EVEX.R bit field (EVEX Byte 1, bit [7]-R), EVEX.X bit field (EVEX byte 1, bit [6]-X), and 557BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 510—this is the first part of the REX' field 510 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 615 (EVEX byte 1, bits [3:0]-mmmm)—its content encodes an implied leading opcode byte (0F, 0F 38, or 0F 3).

Data element width field 564 (EVEX byte 2, bit [7]-W)—is represented by the notation EVEX.W. EVEX.W is used to define the granularity (size) of the datatype (either 32-bit data elements or 64-bit data elements).

EVEX.vvvv 620 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 620 encodes the 4 low-order bits of the first source register specifier stored in inverted (1s complement) form. Depending on the instruction, an extra different EVEX bit field is used to extend the specifier size to 32 registers.

EVEX.U 568 Class field (EVEX byte 2, bit [2]-U)—If EVEX.U=0, it indicates class A or EVEX.U0; if EVEX.U=1, it indicates class B or EVEX.U1.

Prefix encoding field 625 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decode circuit's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 552 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 554 (EVEX byte 3, bits [6:4]-SSS, also known as EVEX.$s_{2-0}$, EVEX.$r_{2-0}$, EVEX.rr1, EVEX.LL0, EVEX.LLB; also illustrated with PPP(3))—as previously described, this field is context specific.

REX' field 510—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 570 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 630 (Byte 4) is also known as the opcode byte. Part of the opcode is specified in this field.

MOD R/M Field 640 (Byte 5) includes MOD field 642, Reg field 644, and R/M field 646. As previously described, the MOD field's 642 content distinguishes between memory access and non-memory access operations. The role of Reg field 644 can be summarized to two situations: encoding either the destination register operand or a source register operand, or be treated as an opcode extension and not used to encode any instruction operand. The role of R/M field 646 may include the following: encoding the instruction operand that references a memory address, or encoding either the destination register operand or a source register operand.

Scale, Index, Base (SIB) Byte (Byte 6)—As previously described, the scale field's 550 content is used for memory address generation. SIB.xxx 654 and SIB.bbb 656—the contents of these fields have been previously referred to with regard to the register indexes Xxxx and Bbbb.

Displacement field 562A (Bytes 7-10)—when MOD field 642 contains 10, bytes 7-10 are the displacement field 562A, and it works the same as the legacy 32-bit displacement (disp32) and works at byte granularity.

Displacement factor field 562B (Byte 7)—when MOD field 642 contains 01, byte 7 is the displacement factor field 562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 562B is a reinterpretation of disp8; when using displacement factor field 562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 562B substitutes the legacy x86 instruction set 8-bit displacement. Thus, the displacement factor field 562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 572 operates as previously described.

Full Opcode Field

FIG. 6B is a block diagram illustrating the fields of the specific vector friendly instruction format 600 that make up the full opcode field 574 according to one embodiment of the disclosure. Specifically, the full opcode field 574 includes the format field 540, the base operation field 542, and the data element width (W) field 564. The base operation field 542 includes the prefix encoding field 625, the opcode map field 615, and the real opcode field 630.

Register Index Field

FIG. 6C is a block diagram illustrating the fields of the specific vector friendly instruction format 600 that make up the register index field 544 according to one embodiment of the disclosure. Specifically, the register index field 544 includes the REX field 605, the REX' field 610, the MODR/M.reg field 644, the MODR/M.r/m field 646, the VVVV field 620, xxx field 654, and the bbb field 656.

Augmentation Operation Field

Figure 6D:
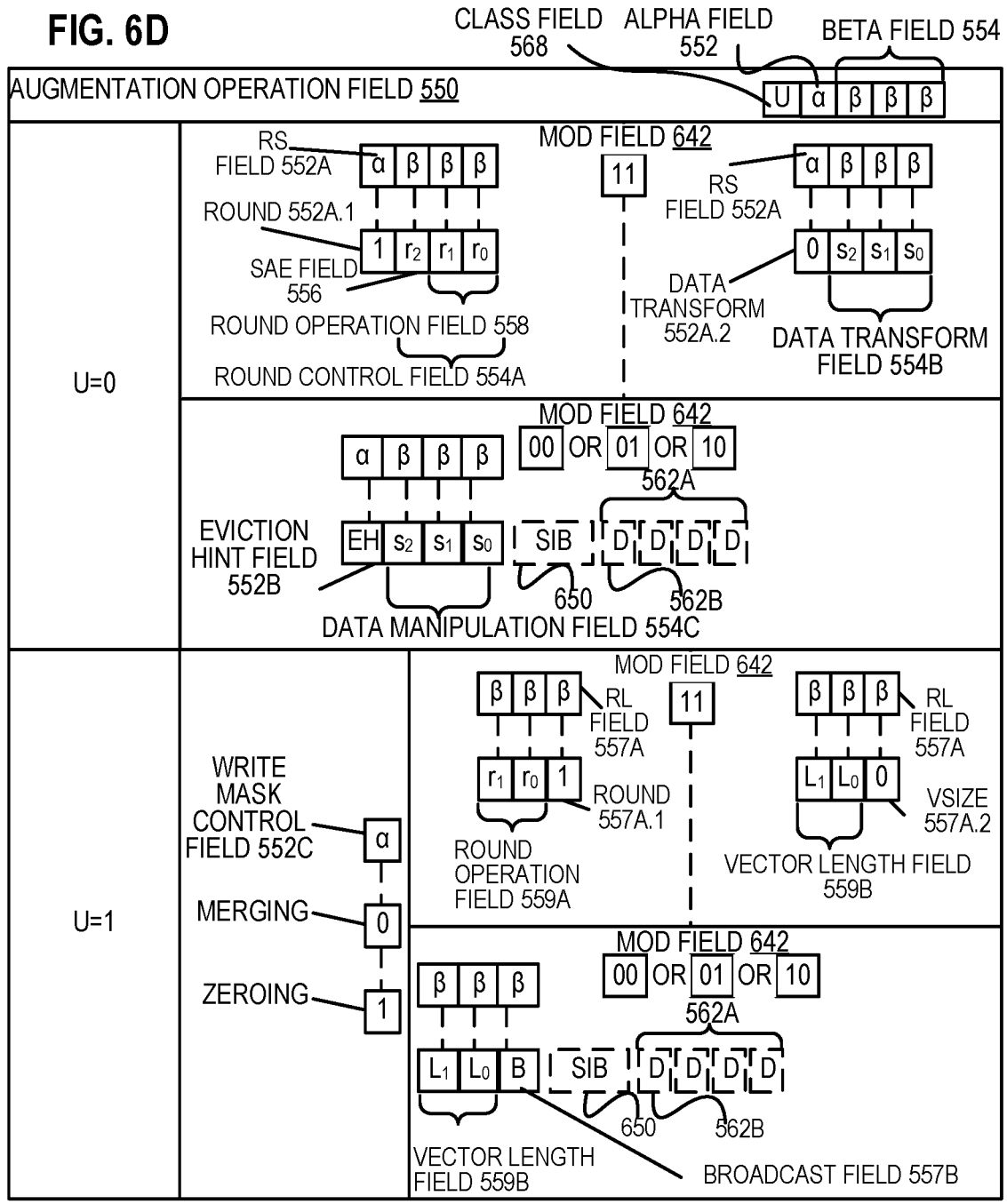
FIG. 6D is a block diagram illustrating the fields of the specific vector friendly instruction format in FIG. 6A that make up the augmentation operation field 550 according to one embodiment of the disclosure.

FIG. 6D is a block diagram illustrating the fields of the specific vector friendly instruction format 600 that make up the augmentation operation field 550 according to one embodiment of the disclosure. When the class (U) field 568 contains 0, it signifies EVEX.U0 (class A 568A); when it contains 1, it signifies EVEX.U1 (class B 568B). When U=0 and the MOD field 642 contains 11 (signifying a no memory access operation), the alpha field 552 (EVEX byte 3, bit [7]-EH) is interpreted as the rs field 552A. When the rs field 552A contains a 1 (round 552A.1), the beta field 554 (EVEX byte 3, bits [6:4]-SSS) is interpreted as the round control field 554A. The round control field 554A includes a one bit SAE field 556 and a two bit round operation field 558. When the rs field 552A contains a 0 (data transform 552A.2), the beta field 554 (EVEX byte 3, bits [6:4]-SSS) is interpreted as a three bit data transform field 554B. When U=0 and the MOD field 642 contains 00, 01, or 10 (signifying a memory access operation), the alpha field 552 (EVEX byte 3, bit [7]-EH) is interpreted as the eviction hint (EH) field 552B and the beta field 554 (EVEX byte 3, bits [6:4]-SSS) is interpreted as a three bit data manipulation field 554C.

When U=1, the alpha field 552 (EVEX byte 3, bit [7]-EH) is interpreted as the write mask control (Z) field 552C. When U=1 and the MOD field 642 contains 11 (signifying a no memory access operation), part of the beta field 554 (EVEX byte 3, bit [4]-$S_0$) is interpreted as the RL field 557A; when it contains a 1 (round 557A.1) the rest of the beta field 554 (EVEX byte 3, bit [6-5]-$S_{2-1}$) is interpreted as the round operation field 559A, while when the RL field 557A contains a 0 (VSIZE 557.A2) the rest of the beta field 554 (EVEX byte 3, bit [6-5]-$S_{2-1}$) is interpreted as the vector length field 559B (EVEX byte 3, bit [6-5]-$L_{1-0}$). When U=1 and the MOD field 642 contains 00, 01, or 10 (signifying a memory access operation), the beta field 554 (EVEX byte 3, bits [6:4]-SSS) is interpreted as the vector length field 559B (EVEX byte 3, bit [6-5]-$L_{1-0}$) and the broadcast field 557B (EVEX byte 3, bit [4]-B).

Exemplary Register Architecture

Figure 7:
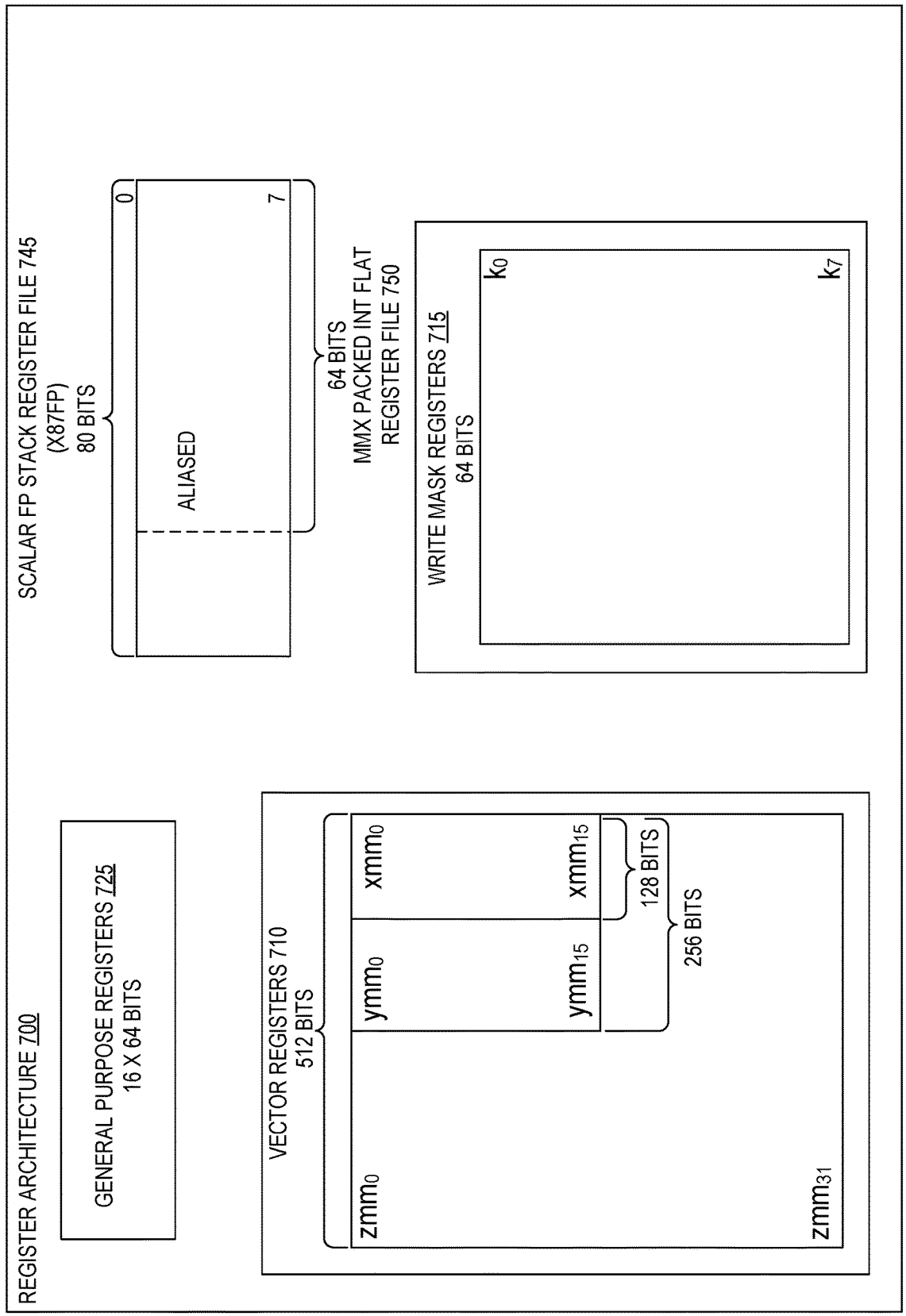
FIG. 7 is a block diagram of a register architecture according to one embodiment of the disclosure

FIG. 7 is a block diagram of a register architecture 700 according to one embodiment of the disclosure. In the embodiment illustrated, there are 32 vector registers 710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 600 operates on these overlaid register file as illustrated in the below tables.

| Adjustable Vector Length | Class | Operations | Registers |
|---|---|---|---|
| Instruction Templates that do not include the vector length field 559B | A (FIG. 5A; U = 0) | 510, 515, 525, 530 | zmm registers (the vector length is 64 byte) |
| | B (FIG. 5B; U = 1) | 512 | zmm registers (the vector length is 64 byte) |
| Instruction templates that do include the vector length field 559B | B (FIG. 5B; U = 1) | 517, 527 | zmm, ymm, or xmm registers (the vector length is 64 byte, 32 byte, or 16 byte) depending on the vector length field 559B |

In other words, the vector length field 559B selects between a maximum length and one or more other shorter lengths, where each such shorter length is half the length of the preceding length; and instructions templates without the vector length field 559B operate on the maximum vector length. Further, in one embodiment, the class B instruction templates of the specific vector friendly instruction format 600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 715—in the embodiment illustrated, there are 8 write mask registers (k0 through k7), each 64 bits in size. In an alternate embodiment, the write mask registers 715 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 745, on which is aliased the MMX packed integer flat register file 750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 8A is a block diagram illustrating both an exemplary in-order pipeline and an exemplary register renaming, out-of-order issue/execution pipeline according to embodiments of the disclosure. FIG. 8B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (e.g., decode circuit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macro-instructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 (e.g., execution circuits) and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 9B:
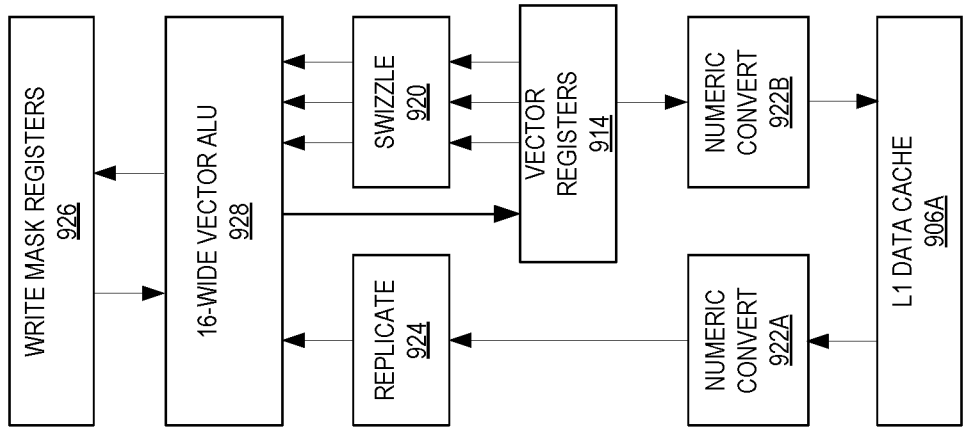
FIG. 9B is an expanded view of part of the processor core in FIG. 9A according to embodiments of the disclosure.
Figure 9A:
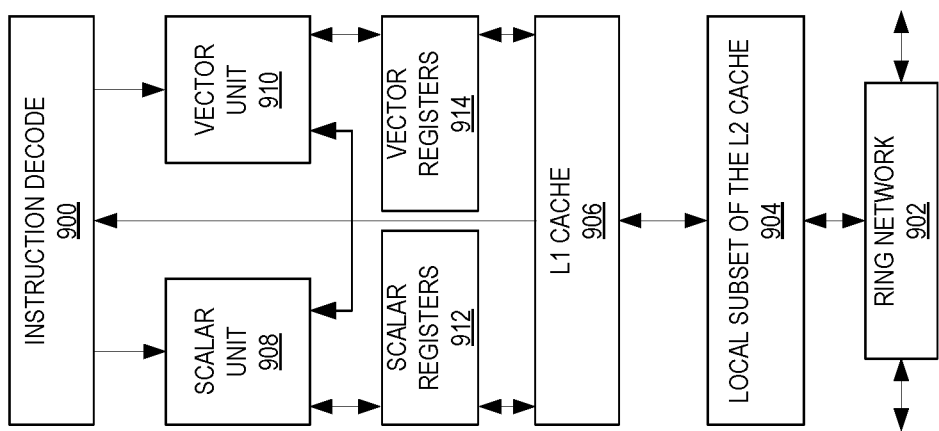
FIG. 9A is a block diagram of a single processor core, along with its connection to the on-die interconnect network and with its local subset of the Level 2 (L2) cache, according to embodiments of the disclosure.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the disclosure. In one embodiment, an instruction decode unit 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the disclosure may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the disclosure. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
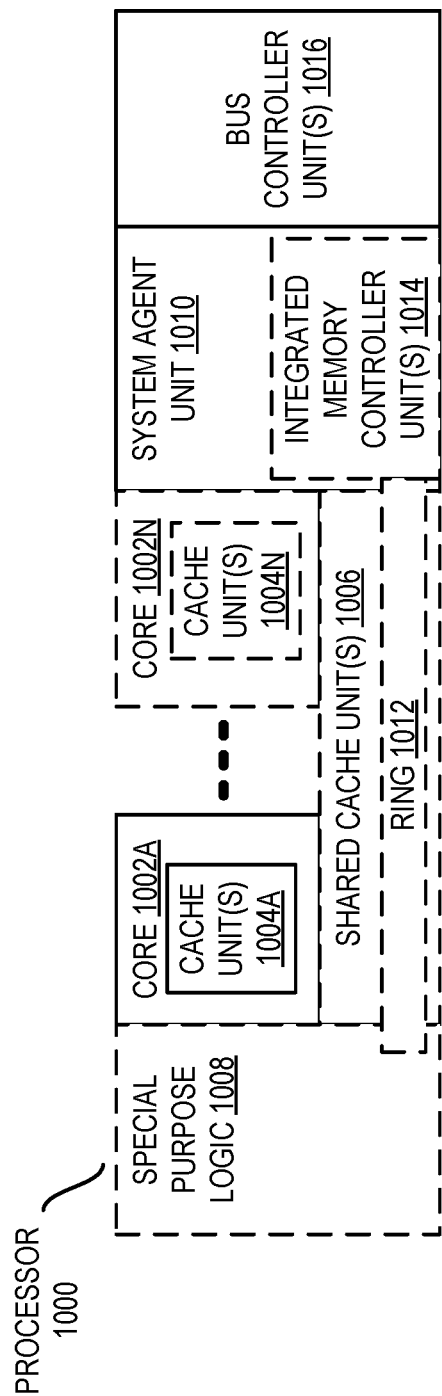
FIG. 10 is a block diagram of a processor that may have more than one core, may have an integrated memory controller, and may have integrated graphics according to embodiments of the disclosure.

FIG. 10 is a block diagram of a processor 1000 that may have more than one core, may have an integrated memory controller, and may have integrated graphics according to embodiments of the disclosure. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
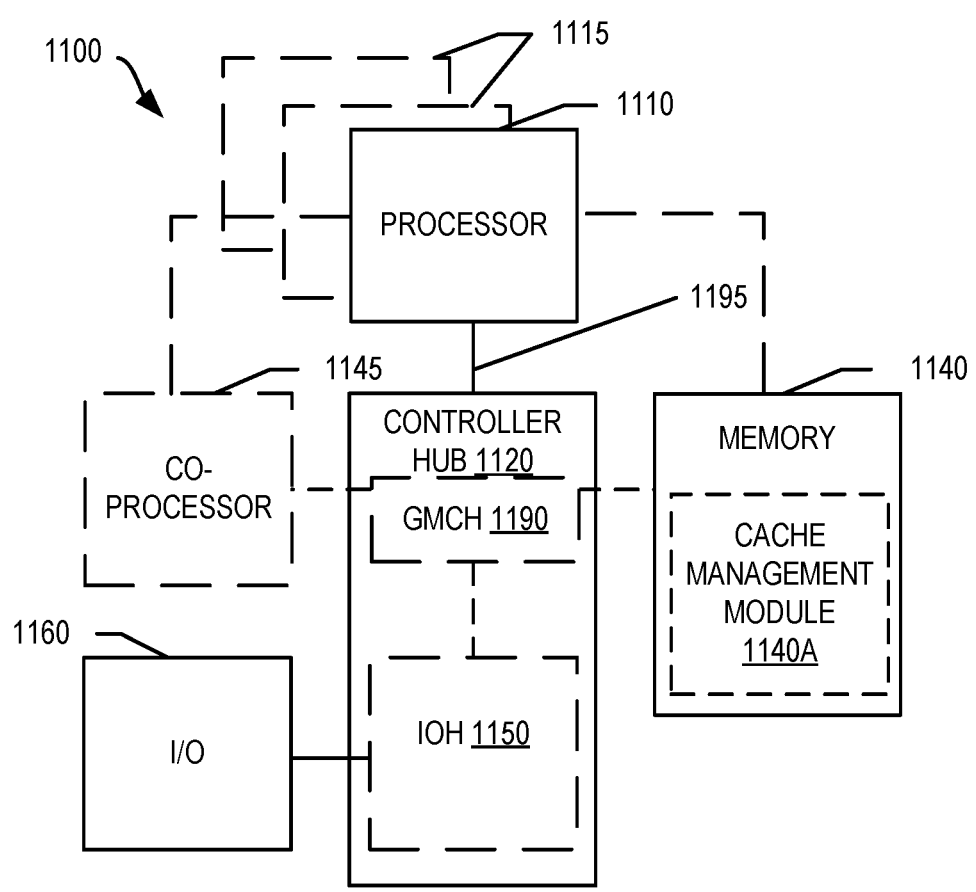
FIG. 11 is a block diagram of a system in accordance with one embodiment of the present disclosure.

Referring now to FIG. 11, shown is a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150. Memory 1140 may include a cache management module 1140A, for example, to store code that when executed causes a processor to perform any method of this disclosure.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as Quickpath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
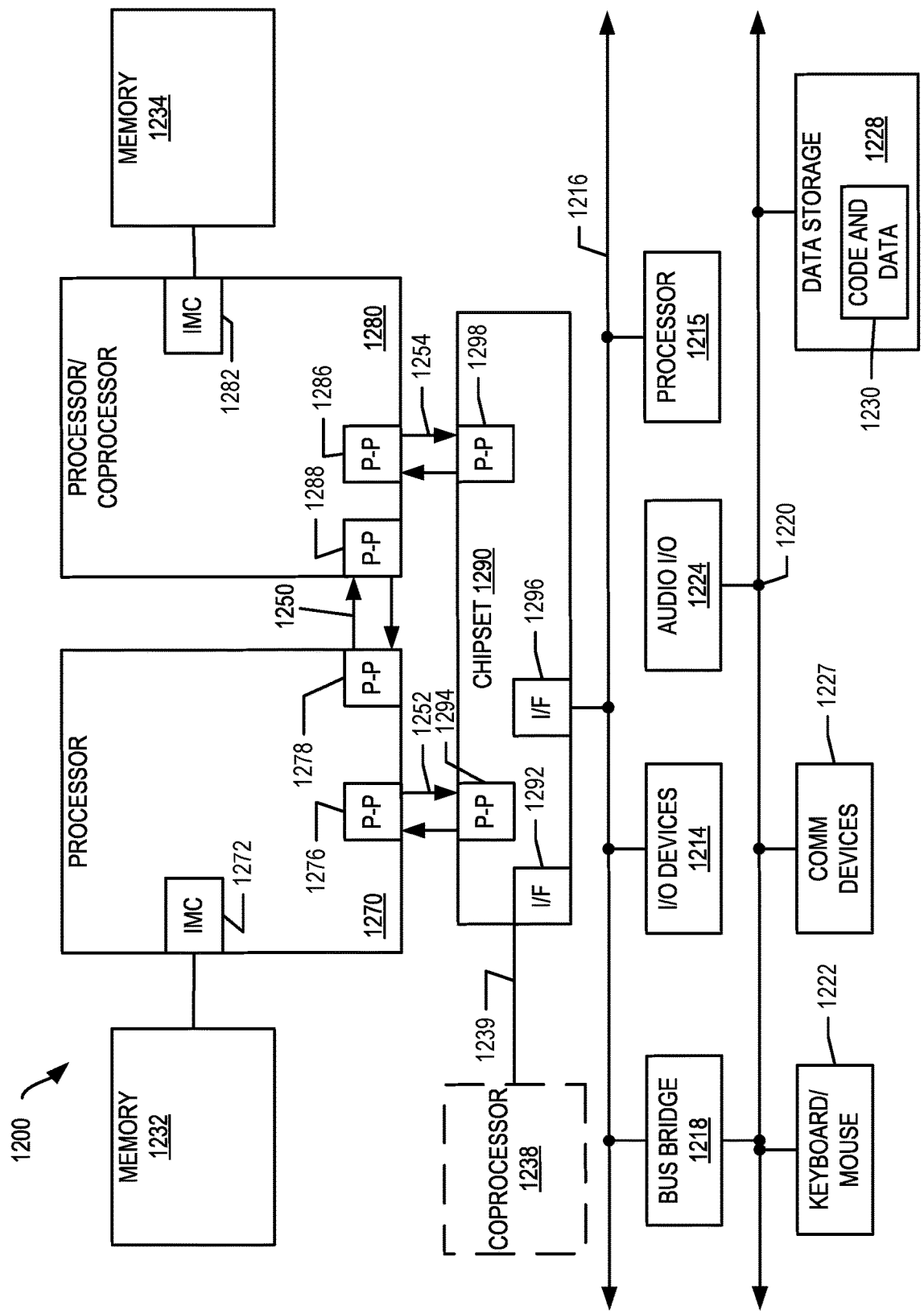
FIG. 12 is a block diagram of a more specific exemplary system in accordance with an embodiment of the present disclosure.

Referring now to FIG. 12, shown is a block diagram of a first more specific exemplary system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPG-PU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
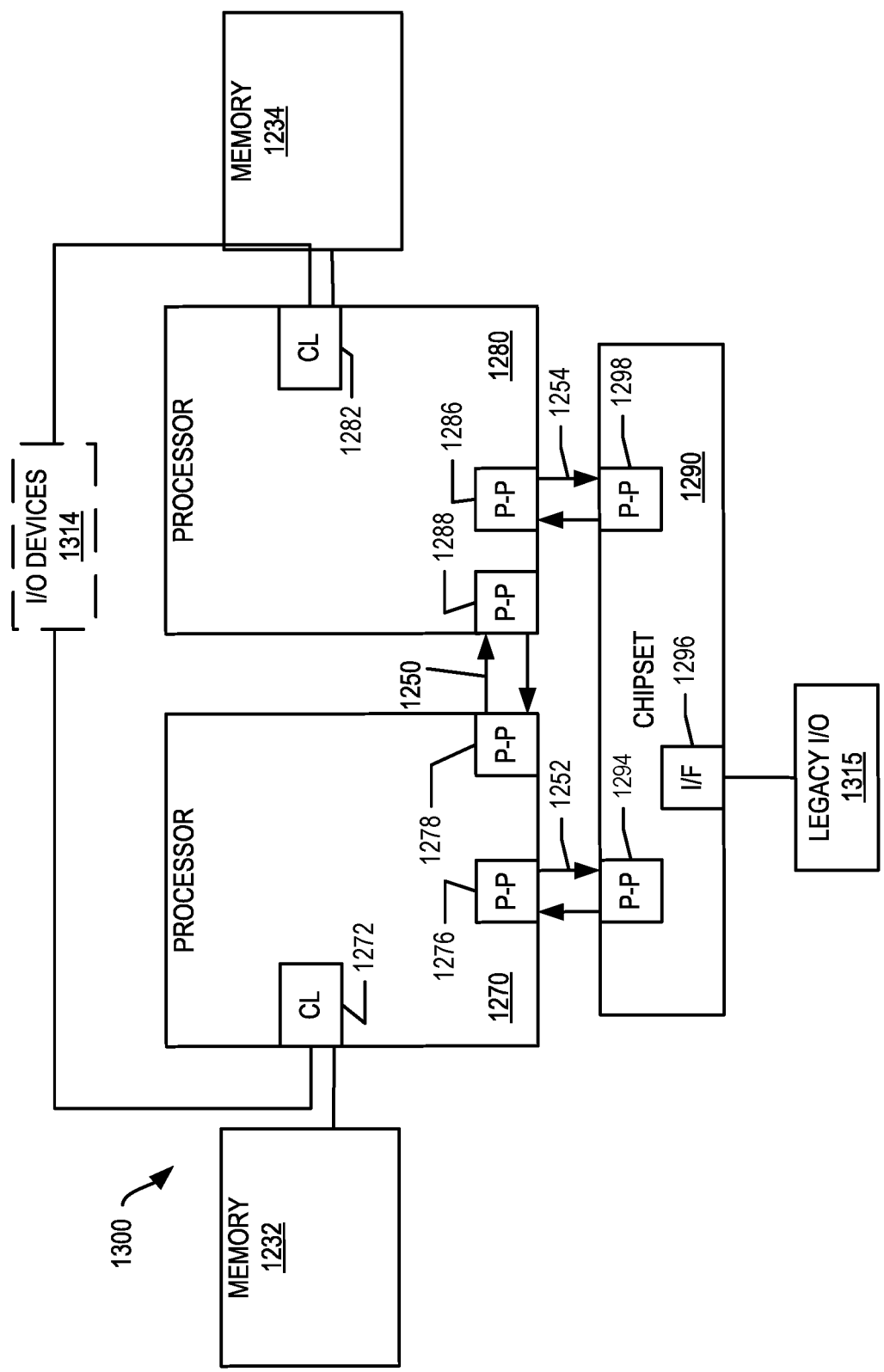
FIG. 13, shown is a block diagram of a second more specific exemplary system in accordance with an embodiment of the present disclosure.

Referring now to FIG. 13, shown is a block diagram of a second more specific exemplary system 1300 in accordance with an embodiment of the present disclosure Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
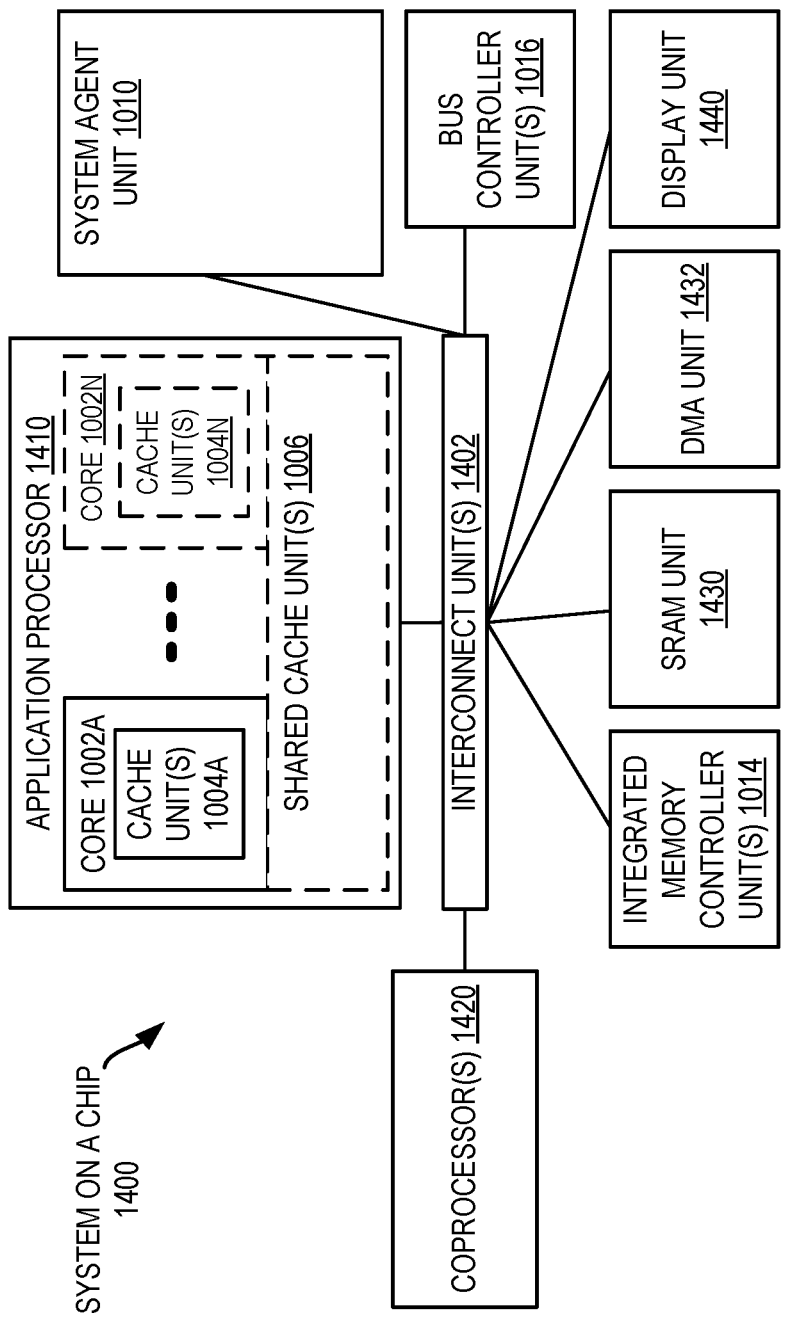
FIG. 14, shown is a block diagram of a system on a chip (SoC) in accordance with an embodiment of the present disclosure.

Referring now to FIG. 14, shown is a block diagram of a SoC 1400 in accordance with an embodiment of the present disclosure. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

What is claimed is:

1. An apparatus comprising:
a cache;
a decoder to decode instructions into decoded instructions;
an execution unit to execute the decoded instructions to produce resultants;
a store buffer to store, in program order, a first storage request, a second storage request, and a third storage request for the resultants from the execution unit;
a fill buffer; and
a cache controller to:
allocate a first entry of a plurality of entries in the fill buffer to store the first storage request when the first storage request misses in the cache,
send a first request for ownership to another cache corresponding to the first storage request,
detect a hit in the cache for the second storage request,
update a globally observable buffer to indicate the first entry in the fill buffer for the first storage request is earlier in program order than the second storage request in the store buffer,
allocate, before the second storage request is removed from the store buffer, a second entry of the plurality of entries in the fill buffer to store the third storage request when the third storage request misses in the cache,
send a second request for ownership to another cache corresponding to the third storage request, and
update the globally observable buffer to indicate the second entry in the fill buffer for the third storage request is later in program order than the second storage request in the store buffer.

2. The apparatus of claim 1, wherein the cache controller is to send the second request for ownership to the another cache corresponding to the third storage request before the second storage request is removed from the store buffer.

3. The apparatus of claim 1, wherein the cache controller is to remove the first entry in the fill buffer for the first storage request and remove the first storage request from the store buffer when a first confirmation response is received for the first request for ownership.

4. The apparatus of claim 3, wherein a second confirmation response for the second request for ownership arrives before the first confirmation response for the first request for ownership.

5. The apparatus of claim 1, wherein a format of each entry in the store buffer includes a bit to indicate when that entry is to be redispatched to the cache.

6. The apparatus of claim 1, wherein the globally observable buffer is a linked list, and the cache controller updates the globally observable buffer to indicate the first entry in the fill buffer for the first storage request is earlier in program order than the second storage request in the store buffer and to indicate the second entry in the fill buffer for the third storage request is later in program order than the second storage request in the store buffer comprises linking the first entry in the fill buffer for the first storage request to a corresponding entry in the store buffer for the second storage request, and linking the corresponding entry in the store buffer for the second storage request to the second entry in the fill buffer for the third storage request.

7. The apparatus of claim 6, wherein a storage request for a hit in the cache is only to write to the cache when the storage request is at a head of the linked list.

8. The apparatus of claim 1, wherein the fill buffer does not include an entry for a hit in the cache.

9. A method comprising:
decoding instructions into decoded instructions with a decoder of a processor;
executing the decoded instructions with an execution unit of the processor to produce resultants;
storing, in program order, a first storage request, a second storage request, and a third storage request for the resultants from the execution unit into a store buffer of the processor;
allocating a first entry of a plurality of entries in a fill buffer of the processor with a cache controller of the processor to store the first storage request when the first storage request misses in a cache of the processor;
sending a first request for ownership with the cache controller to another cache corresponding to the first storage request;
detecting a hit in the cache for the second storage request with the cache controller;
updating a globally observable buffer with the cache controller to indicate the first entry in the fill buffer for the first storage request is earlier in program order than the second storage request in the store buffer;
allocating, before the second storage request is removed from the store buffer, a second entry of the plurality of entries in the fill buffer with the cache controller to store the third storage request when the third storage request misses in the cache;
sending a second request for ownership with the cache controller to another cache corresponding to the third storage request; and
updating the globally observable buffer with the cache controller to indicate the second entry in the fill buffer for the third storage request is later in program order than the second storage request in the store buffer.

10. The method of claim 9, wherein the sending of the second request for ownership with the cache controller to the another cache corresponding to the third storage request is before the second storage request is removed from the store buffer.

11. The method of claim 9, further comprising the cache controller removing the first entry in the fill buffer for the first storage request and removing the first storage request from the store buffer when a first confirmation response is received for the first request for ownership.

12. The method of claim 11, wherein a second confirmation response for the second request for ownership arrives before the first confirmation response for the first request for ownership.

13. The method of claim 9, wherein a format of each entry in the store buffer includes a bit to indicate when that entry is to be redispatched to the cache.

14. The method of claim 9, wherein the globally observable buffer is a linked list, and the updating the globally observable buffer to indicate the first entry in the fill buffer for the first storage request is earlier in program order than the second storage request in the store buffer and to indicate the second entry in the fill buffer for the third storage request is later in program order than the second storage request in the store buffer comprises the cache controller linking the first entry in the fill buffer for the first storage request to a corresponding entry in the store buffer for the second storage request, and linking the corresponding entry in the store buffer for the second storage request to the second entry in the fill buffer for the third storage request.

15. The method of claim 14, wherein a storage request for a hit in the cache only writes to the cache when the storage request is at a head of the linked list.

16. The method of claim 9, wherein the fill buffer does not include an entry for a hit in the cache.

17. A non-transitory machine readable medium that stores code that when executed by a machine causes the machine to perform a method comprising:
decoding instructions into decoded instructions with a decoder of a processor;
executing the decoded instructions with an execution unit of the processor to produce resultants;
storing, in program order, a first storage request, a second storage request, and a third storage request for the resultants from the execution unit into a store buffer of the processor;
allocating a first entry of a plurality of entries in a fill buffer of the processor with a cache controller of the processor to store the first storage request when the first storage request misses in a cache of the processor;
sending a first request for ownership with the cache controller to another cache corresponding to the first storage request;
detecting a hit in the cache for the second storage request with the cache controller;
updating a globally observable buffer with the cache controller to indicate the first entry in the fill buffer for the first storage request is earlier in program order than the second storage request in the store buffer;
allocating, before the second storage request is removed from the store buffer, a second entry of the plurality of entries in the fill buffer with the cache controller to store the third storage request when the third storage request misses in the cache;

sending a second request for ownership with the cache controller to another cache corresponding to the third storage request; and updating the globally observable buffer with the cache controller to indicate the second entry in the fill buffer for the third storage request is later in program order than the second storage request in the store buffer.

18. The non-transitory machine readable medium of claim 17, wherein the sending of the second request for ownership with the cache controller to the another cache corresponding to the third storage request is before the second storage request is removed from the store buffer.

19. The non-transitory machine readable medium of claim 17, further comprising the cache controller removing the first entry in the fill buffer for the first storage request and removing the first storage request from the store buffer when a first confirmation response is received for the first request for ownership.

20. The non-transitory machine readable medium of claim 19, wherein a second confirmation response for the second request for ownership arrives before the first confirmation response for the first request for ownership.

21. The non-transitory machine readable medium of claim 17, wherein a format of each entry in the store buffer includes a bit to indicate when that entry is to be redispatched to the cache.

22. The non-transitory machine readable medium of claim 17, wherein the globally observable buffer is a linked list, and the updating the globally observable buffer to indicate the first entry in the fill buffer for the first storage request is earlier in program order than the second storage request in the store buffer and to indicate the second entry in the fill buffer for the third storage request is later in program order than the second storage request in the store buffer comprises the cache controller linking the first entry in the fill buffer for the first storage request to a corresponding entry in the store buffer for the second storage request, and linking the corresponding entry in the store buffer for the second storage request to the second entry in the fill buffer for the third storage request.

23. The non-transitory machine readable medium of claim 22, wherein a storage request for a hit in the cache only writes to the cache when the storage request is at a head of the linked list.

24. The non-transitory machine readable medium of claim 17, wherein the fill buffer does not include an entry for a hit in the cache.

* * * * *